(12) United States Patent
Ito et al.

(10) Patent No.: US 11,255,994 B2
(45) Date of Patent: Feb. 22, 2022

(54) EARTH MODEL GENERATION VIA MEASUREMENTS

(71) Applicant: Schlumberger Technology Corporation, Sugar Land, TX (US)

(72) Inventors: Koji Ito, Sugar Land, TX (US); Xiao Bo Hong, Sugar Land, TX (US); Keli Sun, Sugar Land, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 298 days.

(21) Appl. No.: 16/345,806

(22) PCT Filed: Oct. 25, 2017

(86) PCT No.: PCT/US2017/058172
§ 371 (c)(1),
(2) Date: Apr. 29, 2019

(87) PCT Pub. No.: WO2018/081188
PCT Pub. Date: May 3, 2018

(65) Prior Publication Data
US 2019/0265373 A1    Aug. 29, 2019

Related U.S. Application Data

(60) Provisional application No. 62/413,545, filed on Oct. 27, 2016.

(51) Int. Cl.
*G01V 1/28* (2006.01)
*E21B 47/16* (2006.01)
(Continued)

(52) U.S. Cl.
CPC ............ *G01V 1/282* (2013.01); *E21B 17/025* (2013.01); *E21B 47/16* (2013.01); *G01V 1/50* (2013.01);
(Continued)

(58) Field of Classification Search
CPC ...... G01V 1/282; G01V 11/00; G01V 99/005; G01V 1/50; G01V 2210/616; G01V 2210/66; E21B 47/16
See application file for complete search history.

(56) References Cited

U.S. PATENT DOCUMENTS 10,520,643 B2 * 12/2019 Bjornemo ................ G01V 3/38
2010/0283788 A1 * 11/2010 Rothnemer ........... E21B 47/002
345/473

(Continued)

OTHER PUBLICATIONS

International Preliminary Report on Patentability issued in International Patent application PCT/US2017/058172, dated Apr. 30, 2019, 12 pages.

(Continued)

*Primary Examiner* — Mischita L Henson

(57) ABSTRACT

A method includes receiving information for a subsurface region; based at least in part on the information, identifying sub-regions within the subsurface region; assigning individual identified sub-regions a dimensionality of a plurality of different dimensionalities that correspond to a plurality of different models; via a model-based computational framework, generating at least one result for at least one of the individual identified sub-regions based at least in part on at least one assigned dimensionality; and consolidating the at least one result for multiple sub-regions.

20 Claims, 16 Drawing Sheets

(51) Int. Cl.
    *G01V 1/50*     (2006.01)
    *G01V 11/00*     (2006.01)
    *G01V 99/00*     (2009.01)
    *E21B 17/02*     (2006.01)

(52) U.S. Cl.
    CPC ............ *G01V 11/00* (2013.01); *G01V 99/005* (2013.01); *G01V 2210/614* (2013.01); *G01V 2210/616* (2013.01); *G01V 2210/626* (2013.01); *G01V 2210/6224* (2013.01); *G01V 2210/6242* (2013.01); *G01V 2210/6244* (2013.01)

(56) References Cited

U.S. PATENT DOCUMENTS

| | | |
|---|---|---|
| 2011/0125471 A1 | 5/2011 | Craig et al. |
| 2011/0153300 A1 | 6/2011 | Holl et al. |
| 2011/0251830 A1 | 10/2011 | Hilliard et al. |
| 2012/0080197 A1 | 4/2012 | Dickens et al. |
| 2013/0327521 A1 | 12/2013 | Menon et al. |
| 2015/0073715 A1 | 3/2015 | Aarre |
| 2016/0237801 A1 | 8/2016 | Sun et al. |
| 2017/0322339 A1* | 11/2017 | Wessling .............. E21B 49/003 |
| 2020/0158898 A1* | 5/2020 | Le Guern .............. G01V 1/282 |

OTHER PUBLICATIONS

International Search Report and Written Opinion issued in International Patent application PCT/US2017/058172 dated Feb. 7, 2018, 16 pages.

Peikert et al., Improved Post-Well Reservoir Characterization Using Image-Constrained Resistivity Inversion—An Example from Ha/Hz Well In Channelized Sand, SPWLA 57th Annual Logging Symposium, Reykjavik, Iceland, Jun. 25-29, 2016, 14 pages.

Peikert et al., Improved Post-Well Reservoir Characterization Using Image-Constrained Resistivity Inversion—An Example From Ha/Hz Well in Channelized Sand, SPWLA 57th Annual Logging Symposium, Jun. 25-29, 2016 (14 pages).

\* cited by examiner

EARTH MODEL GENERATION VIA MEASUREMENTS

RELATED APPLICATION

This application claims priority to and the benefit of a U.S. Provisional Application having Ser. No. 62/413,545, filed 27 Oct. 2016, which is incorporated by reference herein.

BACKGROUND

Exploration of the Earth's subsurface can involve taking various types of measurements. For example, consider seismic tomography, which is a technique for imaging the subsurface of the Earth with seismic waves as generated via surface and/or subsurface emissions of seismic energy. Recorded measurements of one or more types of seismic waves (e.g., P-, S-, and surface waves, etc.) can be used to generate one or more tomographic models, which may be, for example, of different resolutions based on one or more factors (e.g., seismic wavelength, wave source distance, seismograph array coverage, etc.). Data acquired via sensors (e.g., seismometers, etc.) can be utilized to solve an inverse problem, where locations of reflection and refraction of seismic wave paths can be determined. The solution to such an inverse problem (e.g., as in X-ray tomography, etc.) can directly generate one or more images (e.g., earth models, etc.) of features of a subsurface region. For example, an earth model may include locations of velocity anomalies which may be interpreted as structural, thermal, or compositional variations. As with a radiologist that views images (e.g., models) generated via X-ray tomography, nuclear magnetic resonance tomography, ultrasound tomography, etc., a geoscientists can utilize an earth model to enhance development of a reservoir (e.g., drilling, fracturing, completing, injecting, producing, etc.). Field operations can reference an earth model, just as a surgeon can reference a three-dimensional model of the brain (e.g., as reconstructed from nuclear magnetic resonance data, X-ray attenuation data, positron emission tomography data, etc.).

A geoscientist may interact with a computerized system that can render at least a portion of an earth model to a display. For example, a geoscientist may utilize a mouse or a finger to "pick" a horizon in a seismic image (e.g., a type of earth model) such that the horizon can be assigned a particular physical character (e.g., in terms of stratigraphy, etc.). Such an interactive process may be referred to as interpretation, which can involve, for example, analysis of data-based models to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs).

In the field of resource extraction, enhancements to interpretation can allow for generation of a more accurate earth model of a subsurface region, which, in turn, can improve characterization of the subsurface region for purposes of resource extraction. Characterization of one or more subsurface regions in a geologic environment can guide, for example, performance of one or more operations (e.g., field operations, etc.).

SUMMARY

A method can include receiving information for a subsurface region; based at least in part on the information, identifying sub-regions within the subsurface region; assigning individual identified sub-regions a dimensionality of a plurality of different dimensionalities that correspond to a plurality of different models; via a model-based computational framework, generating at least one result for at least one of the individual identified sub-regions based at least in part on at least one assigned dimensionality; and consolidating the at least one result for multiple sub-regions. A system can include a processor; memory operatively coupled to the processor; and processor-executable instructions stored in the memory to instruct the system to: receive information for a subsurface region; based at least in part on the information, identify sub-regions within the subsurface region; assign individual identified sub-regions a dimensionality of a plurality of different dimensionalities that correspond to a plurality of different models; generate at least one result for at least one of the individual identified sub-regions based at least in part on at least one assigned dimensionality; and consolidate the at least one result for multiple sub-regions. One or more computer-readable storage media can include computer-executable instructions executable to instruct a computing system to: receive information for a subsurface region; based at least in part on the information, identify sub-regions within the subsurface region; assign individual identified sub-regions a dimensionality of a plurality of different dimensionalities that correspond to a plurality of different models; generate at least one result for at least one of the individual identified sub-regions based at least in part on at least one assigned dimensionality; and consolidate the at least one result for multiple sub-regions. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
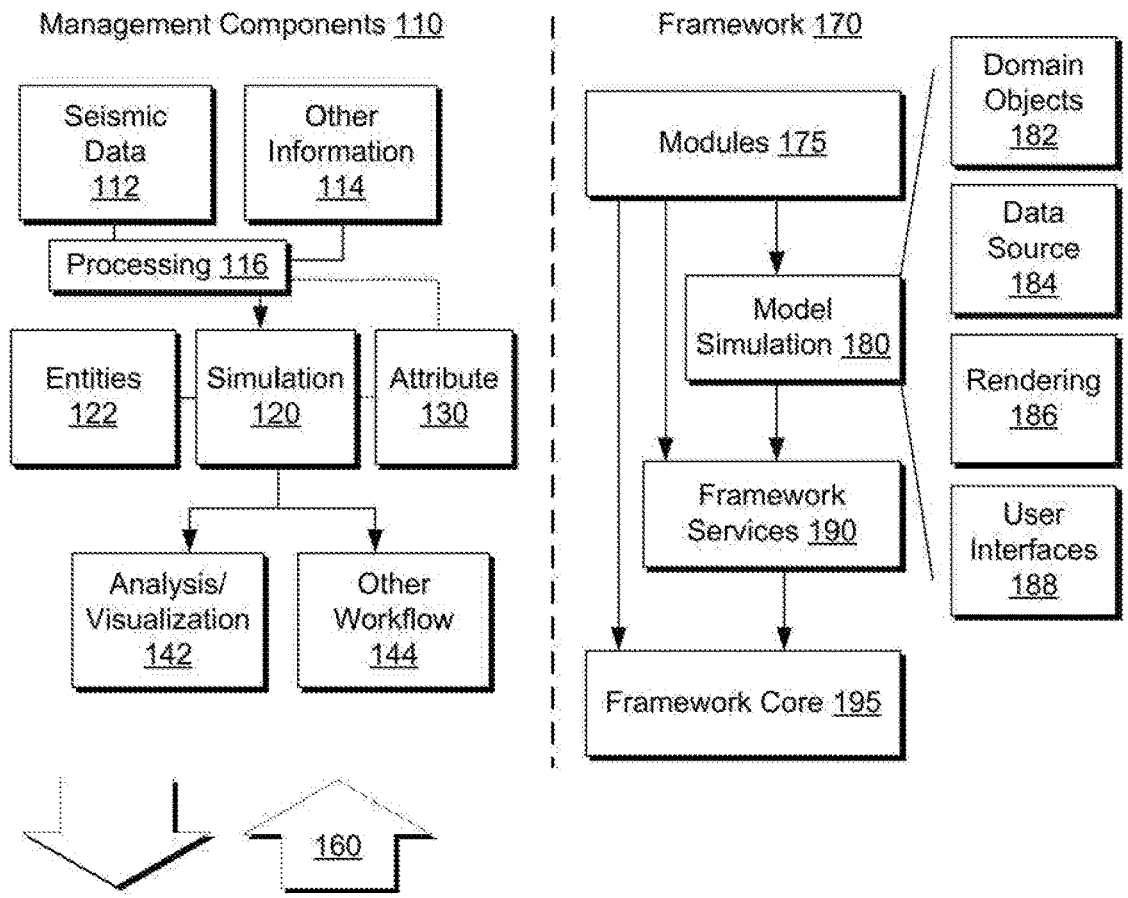
FIG. 1 illustrates an example system that includes various components for modeling a geologic environment and various equipment associated with the geologic environment.
Figure 1:
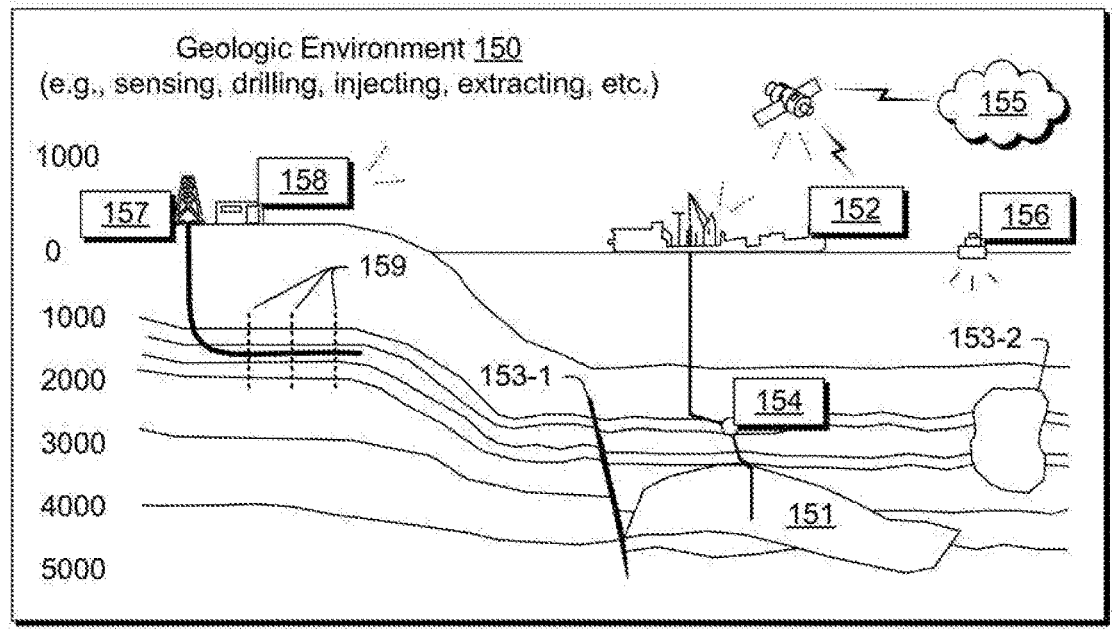

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of a simulation workflow and/or other workflows. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a borehole (e.g., a bore in material such as rock, etc.) can be represented within a multi-dimensional model of a subsurface region where the borehole may be a trajectory, for example, from one point to another point (e.g., from a surface point to a target point). As an example, a trajectory may be one or more of an actual trajectory, a planned trajectory, a trial trajectory, etc. A trajectory may pass through one or more layers of material, one or more geobodies, etc. A trajectory may be defined via an axis such as a central axis formed by a drill bit of a drill string where a bore wall (e.g., borehole wall) may be defined by one or more radii. As an example, a trajectory can be defined in one or more coordinate systems. For example, a trajectory may be defined via a local cylindrical coordinate system (e.g., r, z and $\Theta$) and may be defined via a global Cartesian coordinate system (e.g., X, Y and Z). As an example, a measured depth (MD) may be a distance along an axis of a trajectory (e.g., a borehole) that is measured (e.g., during drilling operations, etc.); whereas, a vertical depth (VD) can be a distance from a surface downward to an axis of a trajectory (e.g., a borehole). Where a trajectory is vertical (e.g., aligned with gravity), measured depth and vertical depth may be substantially the same; whereas, for a trajectory that deviates from vertical (e.g., over at least a portion of the trajectory), measured depth and vertical depth can differ. A deviation from vertical for a borehole may be achieved, for example, via a technique such as a directional drilling technique.

A subset of directional drilling can be horizontal drilling, which may be defined where departure of a trajectory from vertical exceeds approximately 80 degrees; noting that some horizontal trajectories may be designed such that after reaching 90 degrees (horizontal), a trajectory may trend upward. In such an example, a trajectory may be at an angle past 90 degrees (e.g., 95 degrees, etc.), which may also be defined as a deviation from vertical (e.g., 85 degrees, etc.). A deviated trajectory may intersect (e.g., penetrate) a greater length of a reservoir such that a borehole (e.g., a wellbore) can offer a production improvement over a corresponding vertical borehole (e.g., a vertical wellbore).

An Earth model can represent geometry of a trajectory (e.g., a borehole, a wellbore, etc.) with respect to one or more subsurface features. For example, an Earth model can represent how a trajectory intersects one or more layers, a fault, a fracture, etc. As mentioned, a trajectory may be represented via a cylindrical coordinate system and layers may be represented via a Cartesian coordinate system. As an example, an Earth model may provide for geometric representation of a substantially cylindrical trajectory (e.g., bore) through layers represented in a Cartesian coordinate system such that intersection of the trajectory with the layers can be appropriately modeled for one or more purposes (e.g., forward modeling, inversion, etc.) as related to field development (e.g., injection, production, completions, drilling, etc.).

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150 (e.g., one or more earth models), which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features 153-1, 153-2, etc. (e.g., such as the fault feature 153-1, the geobody feature 153-2, etc.). As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
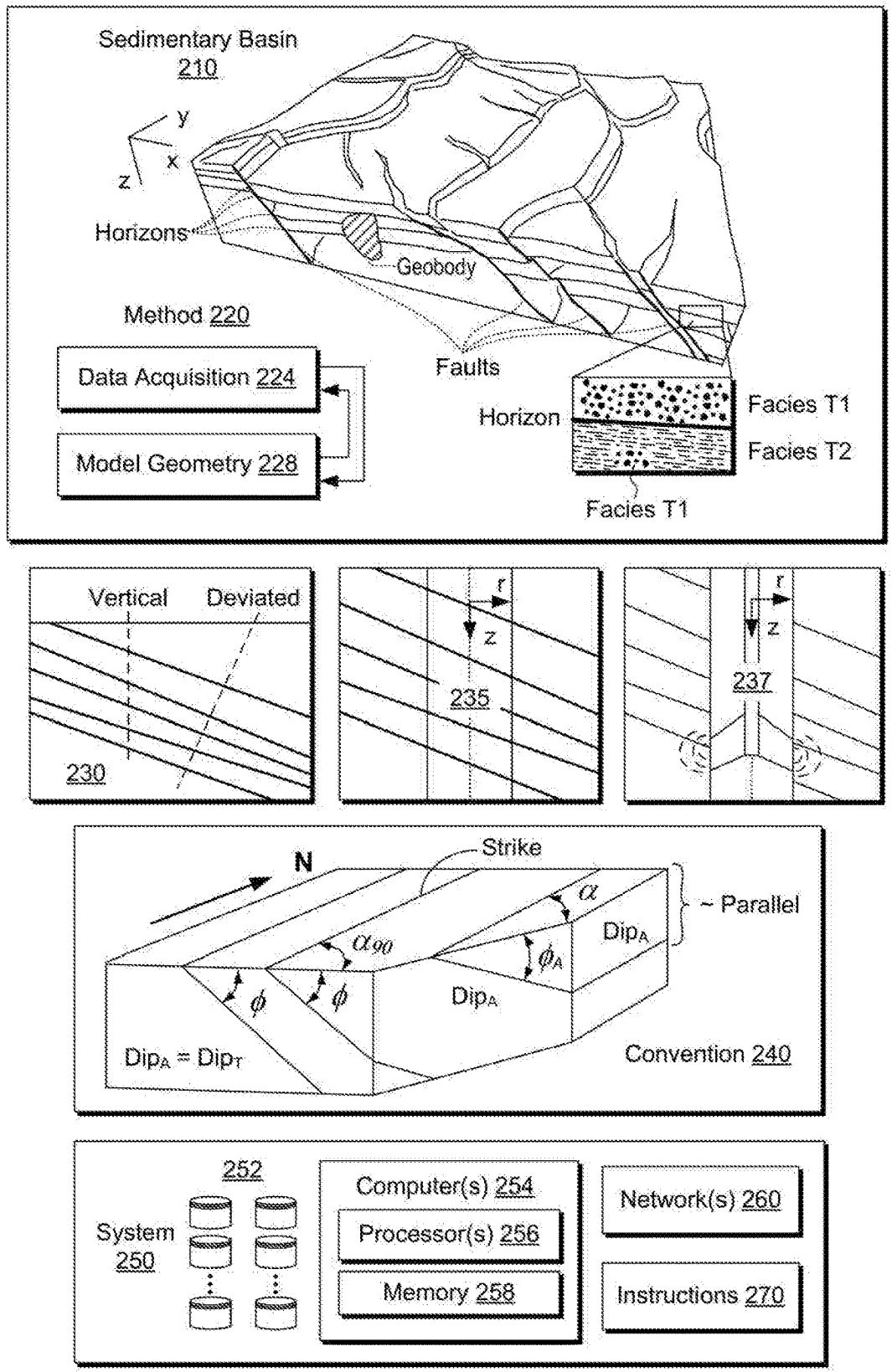
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., an Earth model, etc.), an example of a formation 230, an example of a borehole 235 in a formation, an example of a convention 240 and an example of a system 250.

As an example, drilling simulation, treatment simulation, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. The diagram of the sedimentary basin 210 in FIG. 2 is shown in a section view where a relatively planar side represents a "slice" through a geologic environment, which is not directly visible to the human eye. Indeed, the horizons, faults, geobodies, etc., to the extent shown in the diagram of the sedimentary basin 210, are based at least in part on one or more types of acquired data.

Features can be distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material. As to borehole image data, such data may be utilized to identify one or more types of features such as, for example, horizons, fractures, faults, etc.

As an example, borehole image data may be processed automatically, semi-automatically, etc., using one or more types of feature identification routines implemented by a computational framework. Such routines may include image processing algorithms (e.g., filtering, enhancement, etc.) and may utilize feature recognition (e.g., line recognition, curve recognition, sinusoidal feature recognition, etc.). As an example, information output by a computational framework based at least in part on borehole image data (e.g., and/or one or more other types of downhole tool data) may be utilized in Earth model generation. Data acquired via one or more downhole tools (e.g., borehole tools, etc.) may be referred to as measurement data. As an example, a computational framework may process measurement data and generate at least a portion of an Earth model based at least in part on such processed measurement data. For example, measurement data may indicate that a borehole passes a layer or interface between layers at a particular angle where the angle may be utilized in representing a trajectory in a 2D or 3D model that includes at least the layer or at least the interface between layers. In such an example, consider borehole image data where a horizon may be "picked" automatically and where the picked horizon (e.g., location coordinates, etc.) may be utilized to characterize a subsurface region and/or to characterize geometry of at least a portion of an Earth model that includes a representation of a trajectory (e.g., a borehole, etc.).

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in another orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation. As an example, dip information may be utilized by a computational framework in a workflow to generate, refine, etc., an Earth model that includes a trajectory that represents a borehole. Such a model can include sub-models, which may be regions that may differ in geometry (e.g., sub-model geometry) from one or more other regions. As mentioned, a computational framework may provide for automatic generation of at least a portion of an Earth model (e.g., including automatic generation of at least a portion of one or more sub-models, etc.).

A convention such as the convention 240 may be used with respect to an analysis, an interpretation, an attribute, model generation, forward modeling, inversion, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2. As an example, the system 250 of FIG. 2 may be a computation framework or part of a computational framework.

Figure 3:
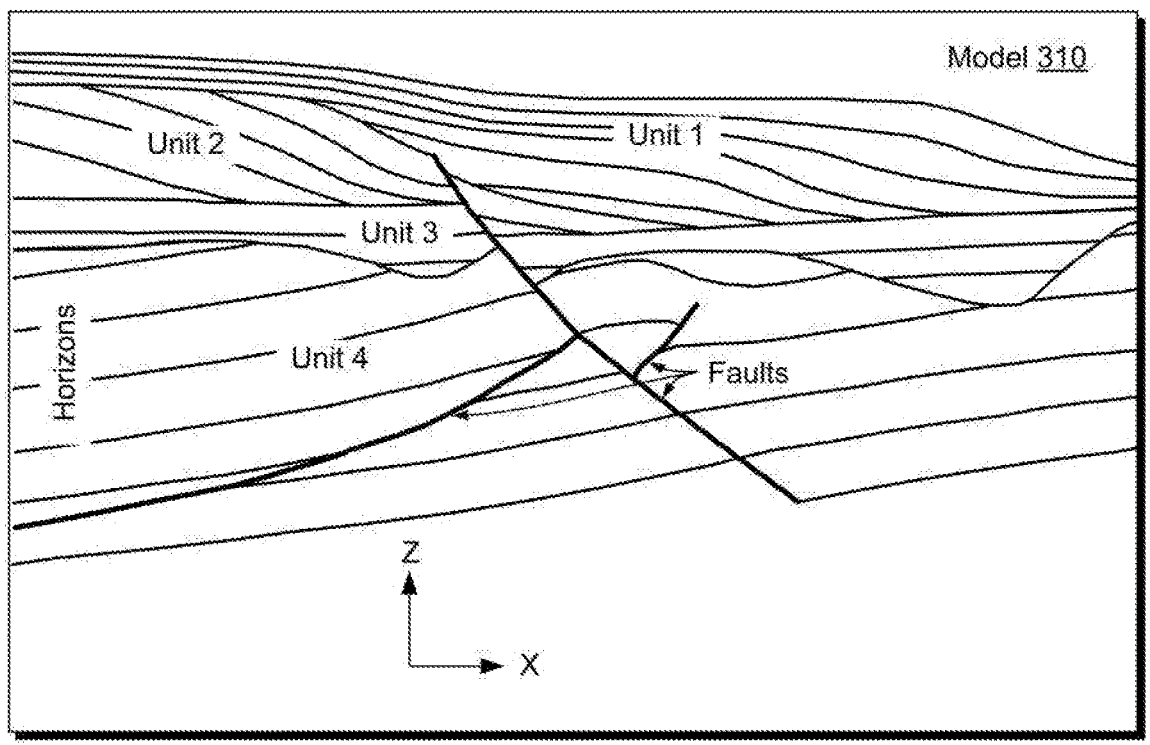
FIG. 3 illustrates examples of models.
Figure 3:
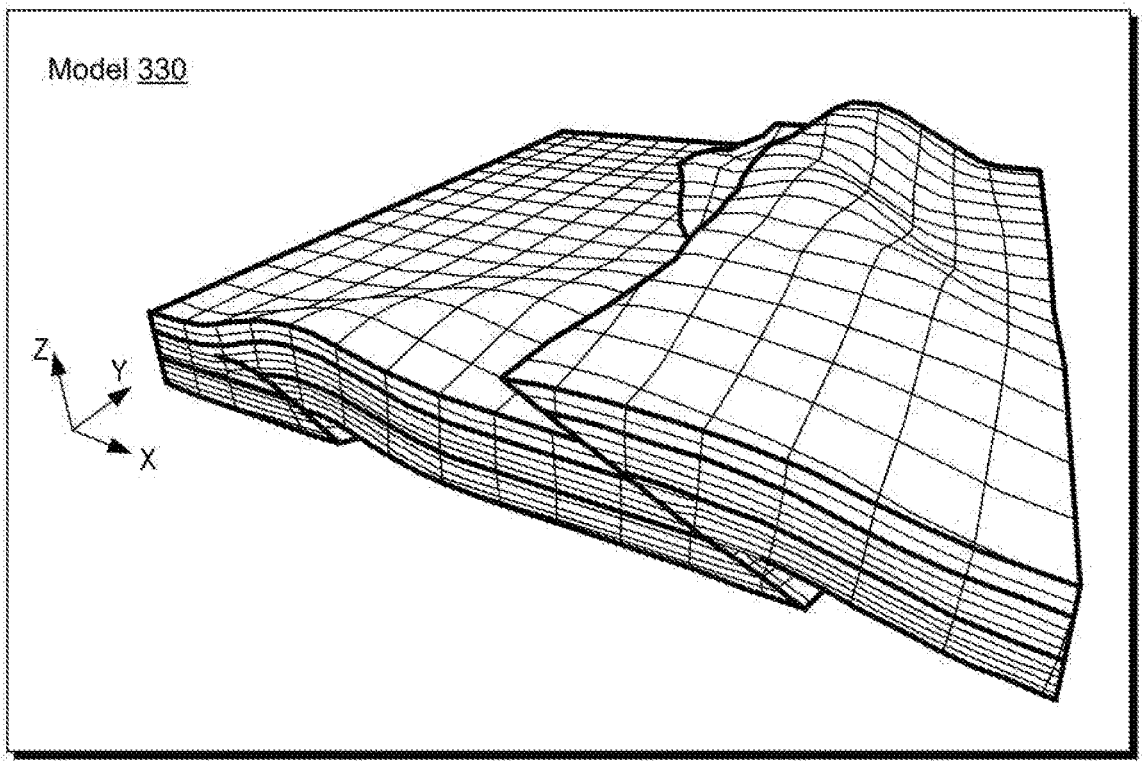

FIG. 3 shows examples of models 310 and 330. As shown in FIG. 3, the model 310 includes various horizons and faults. Such features may be classified into units such as Unit 1, Unit 3, Unit 3 and Unit 4, as shown. Such units may be defined, for example, via one or more conformities, unconformities, etc. The models 310 and 330 of FIG. 3 are shown with respect to coordinate systems, where the model 310 is shown with respect to a two-dimensional Cartesian coordinate system and where the model 330 is shown with respect to a three-dimensional Cartesian coordinate system. In such coordinate systems, the z-dimension (e.g., z-coordinate) can represent depth, which may be depth from a surface location to a subsurface location. As mentioned, a trajectory or trajectories may be represented in a model, for example, as part of a model. As mentioned, a trajectory may optionally be represented via another coordinate system, which may be, for example, a cylindrical coordinate system (e.g., a local cylindrical coordinate system that can include an axis that is vertical, deviated from vertical, horizontal, etc.). As an example, a trajectory may be represented by one or more of a line, one or more linear segments, a curve, one or more curves, etc. As an example, an axis of a trajectory (e.g., a borehole axis) may be represented in such a manner and, for example, referenced with respect to a global coordinate system (e.g., an Earth model coordinate system).

Referring again to various types of features, a conformity can be defined as a bedding surface separating younger from older strata, along which there may be insufficient data that evidences subaerial or submarine erosion or nondeposition, and along which there may be insufficient data that evidences a substantial hiatus. Unconformities (e.g., sequence boundaries) and flooding surfaces (e.g., parasequence boundaries) tend to pass laterally into correlative conformities, or correlative surfaces.

An unconformity can be defined as a geological surface separating older from younger rocks and representing a gap in the geologic record. Such a surface might result from a hiatus in deposition of sediments, possibly in combination with erosion, or deformation such as faulting. An angular unconformity separates younger strata from eroded, dipping older strata. A disconformity represents a time of nondeposition, possibly combined with erosion, and may be difficult to distinguish through acquired data associated with a series of parallel strata. A nonconformity separates overlying strata from eroded, older igneous or metamorphic rocks. The process of interpretation of unconformities locally, regionally and globally is a basis of sequence stratigraphy.

As mentioned, a model such as the model 310 and/or the model 330 can be generated from acquired data such as, for example, downhole drilling data, downhole wireline data, seismic data, etc. As an example, a method can include selecting model dimensionality and generating a multi-dimensionality model that can be utilized for one or more purposes. For example, a multi-dimensionality model can include a plurality of models that are of heterogeneous dimensionality. In such an example, inversion may be utilized on an individual model scale to generate inversion results, which may be combined to generate a larger scale result (e.g., a multi-dimensionality model scale result).

As a model of a subsurface region represents structural features of that subsurface region, the model can be utilized to simulate physical phenomena. For example, a borehole (e.g., a trajectory) can be inserted into the model and a simulated borehole image can be generated at a particular location of the borehole where, for example, a fault or other feature as modeled intersects the borehole. In such an example, the generated borehole image can be expected to have some common features with an actual borehole image as acquired by a downhole tool positioned at the particular location in a borehole in the subsurface region. In such an example, one or more comparisons may be made, which may provide for model refinement.

As an example, where physical properties of material or materials are included in a model, the model may be used to generate a log such as, for example, a resistivity log (e.g., a simulated resistivity log, etc.). Resistivity is the ability of a material to resist electrical conduction. Resistivity is the inverse of conductivity and can be measured in ohm-m. Resistivity can be a physical property of material that is related to other physical properties of the material. For example, porous rock can be a matrix that has a fluid permeability. The resistivity of the porous rock can depend in part on the fluid that occupies various pores of the porous rock. Where a model defines material in a particular location to be porous rock of a particular fluid permeability and with pores occupied by a particular fluid (e.g., oil, water, saline, etc.), the model may be utilized to generate a resistivity log that may be compared to an actual resistivity log. In such an example, one or more differences between the generated resistivity log and the actual resistivity log can be utilized, for example, to refine the model. As an example, an actual resistivity log (e.g., a 1D log along a borehole) may be inverted to generate a resistivity log based model (e.g., a 1D model along the borehole). A resistivity log facilitates formation evaluation and characterization. In particular, consider that hydrocarbons tend to be non-conductive while waters (e.g., aqueous solutions, etc.) tend to be conductive. As such, a notable difference can exist for resistivity of reservoir rocks filled with hydrocarbons compared to reservoir rocks filled with water. Clay minerals and a few other minerals, such as pyrite, also conduct electricity, and may reduce such a difference. Some measurement devices, such as induction and propagation resistivity logs, may respond more directly to conductivity, but may be presented in resistivity.

A downhole tool for measuring resistivity can include one or more features of the ARI™ tool (Schlumberger Limited, Houston, Tex.), which includes components that can make directional measurements around a borehole circumference with a relatively high vertical resolution (e.g., noting that the circumference may vary as to its radius from an axis of the borehole). Using azimuthal electrodes incorporated in a dual laterolog array, the ARI™ tool (e.g., imager) can provide deep oriented resistivity measurements in addition to standard deep and shallow resistivities. The depth of investigation of the deep oriented measurement can access virgin formation, beyond an invaded zone, and the sensitivity of the ARI™ tool's measurements to azimuthal heterogeneities can help to identify anomalous resistivity conditions and discriminate between shallow and deep features. As an example, a relatively shallow auxiliary measurement may provide data that can be utilized to adjust one or more azimuthal resistivities for borehole effects.

Modeling tool responses for a given geological model along a tool path can provide for understanding complex well log responses that may be observed in high angle wells (e.g., including one or more horizontal portions) as well as low angle wells (e.g., including one or more vertical portions).

As to using a model to generate information as to what a tool may acquire in a subsurface region, such a process can be referred to as forward modeling. Forward modeling is a technique for determining what a given sensor would measure in a given formation and environment by applying a set of equations and properties for the sensor response and solving for a solution using a computational framework. Forward modeling can be used to determine the general response of various electromagnetic logging measurements; noting that for nuclear measurements, response tends to be determined via laboratory experiments. Forward modeling can be used for various types of interpretation, particularly in horizontal wells and complex environments. As an example, forward modeling can include iterative forward modeling. As an example, a set of equations (e.g., one or more forward models) can be defined with respect to dimensionality such as, for example, 1D, 2D or 3D. Where geometry of a region is complex and/or where a region is heterogeneous, demand for computing resources can be increased, which can cause delays (e.g., due to more computing time) or cost constraints (e.g., due to more computing power, etc.).

As an example, a forward modeling computational framework may aim to simulate log responses for electromagnetic, nuclear, acoustic, nuclear magnetic resonance, and/or one or more other types of measurements.

A forward modeling computational framework may utilize a model that is based on an assumption that subsurface formations are layered where physical properties within a layer are constant and layer boundaries (e.g., interfaces) are approximately parallel to each other, which may be referred to as a one dimensional layer cake model (e.g., consider a depositional model, etc.). Such an assumption can be valid for some situations because geological layers tend to be formed via one or more depositional processes (e.g., as occurring on a geological time scale).

As an example, a computational framework may provide for generation of sequence stratigraphy and/or refinement of sequence stratigraphy. Sequence stratigraphy may be generated, for example, via one or more types of data (e.g., log, core and seismic data to interpret deposition and/or architecture of sediments). Where a trajectory is represented within a sequence, one or more geometries may result for one or more portions of the trajectory with respect to the sequence or one or more portions thereof. As an example, forward modeling and/or inversion may be performed utilizing at least a portion of an Earth model that includes a trajectory and at least a portion of a sequence. In such an example, one or more model geometries of different dimensionality may be utilized for generation of forward modeling and/or inversion results for multiple portions of the Earth model.

In addition to geological layers, a forward modeling framework may utilize a model that includes one or more radial layers as may exist around a downhole tool, for example, to represent a borehole and invasion of one or more borehole fluids into a formation's pores. Such a radial layer model may be referred to as a two dimensional radial model (e.g., as a type of dimensionality).

Situations exist where more complex models may be desired to increase accuracy of a result (e.g., forward modeling and/or inversion). For example, consider situations that may exhibit one or more of layers not being parallel, layers being discontinuous as interrupted by one or more faults, unconformities with erosion, cross bedding, channel sands, etc. In such situations, more complex two dimensional and/or three dimensional Cartesian models may be provided to account for such physical complexities and to produce accurate responses. Further, where a trajectory or trajectories for one or more boreholes are present, planned, being drilled, etc., the direction or directions can add complexity.

As mentioned, a complex model assumption or dimensionality can result in greater demand for computation resources (e.g., longer time to compute one or more log responses). As an example, in some situations, one or more underlying model geometries may be developed through relaxation of one or more complex model assumption while being able to generate sufficiently accurate results. As an example, when selecting an appropriate model (e.g., and hence modeling framework) for at least a portion of a subsurface region, there can be an appropriate balance between model complexity and response accuracy, which can have an impact on computational demand (e.g., computational resources, processing time, etc.).

A framework that executes on one or more computing devices (e.g., a computational framework) may place model dimensionality for a single encompassing model of a subsurface region (e.g., an interval, etc.) at a user's discretion where the user determines what model dimensionality is more suited for a problem at hand. In such an approach, the framework can receive user input that directly chooses appropriate modeling instructions (e.g., equations, data, etc.) to generate simulated log responses as a result of forward modeling. In such an approach, the process of choosing model dimensionality and then applying proper approximations to an underlying geological model to generate a model that can be consumed by a modeling framework tends to be nontrivial. Such a process can involve various factors and analyses of acquired data, trajectory information, geological information, etc. Further, such a process may or may not generate adequate results. Where results are sub-optimal, a user may start again such that a different dimensionality is chosen. As such, a workflow may be iterative in that failed attempts are utilized by a user to choose a different model dimensionality.

As an example, a method for evaluating a model can include obtaining a geological model, inputting the geological model into a computerized framework (e.g., a computational framework), subdividing the input model into specific regions, determining a dimensionality for each specific region, generating an approximated model for each specific region, performing a forward modeling and/or an inversion for each specific region and splicing results obtained for each specific region together. As an example, such an approach (e.g., a multi-dimensionality approach) can improve chances for convergence of a solution for output of adequate results. By handling dimensionality with some amount of locality, computational resources may be focused on solving equations for one or more regions with particular complexity, etc.; while one or more other regions can be handled using more efficient modeling dimensionality (e.g., or dimensionalities). As an example, where parallel processing capabilities are available (e.g., as part of one or more computational frameworks), a plurality of models of assigned dimensionality may be utilized to output results at least in part in parallel. Whether performed in serial and/or in parallel, a plurality of output results may be consolidated such that results can be output for a region that is greater than that of an individual model.

As an example, a method may include automatically subdividing a given geological model into series of regions, selecting a most appropriate model dimensionality for at least some of the regions and then applying proper approximation(s) to each region to generate a set of models that can be consumed by a computerized forward modeling routine and/or a computerized inversion routine (e.g., as implemented by one or more computational frameworks).

As to automatic subdivision (e.g., automatic dividing), a method can include analyzing structural features of a given geological model optionally in conjunction with one or more trajectories (e.g., whether planned, drilled, being drilled, etc.). A combination of geometric and optionally one or more other types of factors may be utilized in determining whether a region of the geological model is to be a "standalone" region for purposes of dimensionality and results generation. As an example, a method may include consideration of dip and trajectory; trajectory and lithology (e.g., as to likelihood of fluid invasion, etc.); dip and lithology; number of layers and trajectory; number of layers, trajectory and lithology; etc., in determining whether a region is to be standalone and/or in determining dimensionality of a region.

As to dip, as an example, a dip may be compared to one or more dip limits to determine whether dimensionality is to account for dip. As to trajectory, as an example, an angle of approach with respect to an interface (e.g., an interface between two layers, etc.) may be compared to one or more angle limits to determine an appropriate dimensionality. As to lithology, as an example, certain types of lithology may be prone to fluid invasion where fluid invasion may call for a particular type of dimensionality (e.g., radial modeling). As to lithology and trajectory, as an example, a length or lengths of a trajectory with respect to one or more lithologies may be taken into account to determine one or more dimensionalities. As an example, where a layer is thin and relatively impermeable and where a trajectory is substantially normal to the layer, the trajectory may pass through the layer with minimal risk of fluid invasion. As an example, where a layer is relatively thick and made of an anisotropic material that has a relatively high permeability in a direction that is aligned with a radial direction of a trajectory (e.g., radial to a borehole axis), a dimensionality may be automatically selected to account for fluid invasion into the anisotropic material. In various examples, one or more geometric and/or one or more material properties may be taken into account for selection of an appropriate dimensionality for a subsurface region where, for example, that selected, appropriate dimensionality may be utilized for a localized model (e.g., in combination with one or more localized models for other subsurface regions that include one or more adjacent regions).

As an example, an automated method can include balancing accuracy of modeling and processing time and/or computational resource demand. For example, where an underlying geometry can be adequately approximated in one dimension (e.g., 1D model), various multidimensional framework features can be disabled such that generation of simulated log responses may occur utilizing a one-dimensional framework feature(s). Such an approach may be implemented to provide adequate accuracy with minimal processing time (e.g., compared to implementation of the multidimensional framework features).

As an example, a computerized framework may assess computing capabilities and automatically make one or more choices based at least in part on the assessed computing capabilities. As an example, a computerized framework may include provisioning features where one or more computing resources may be provisioned to handle a particular workflow. For example, consider a computerized framework that can provision cloud computing resources. In such an example, a decision to provision such resources and/or a decision to provision a number and/or type of resources may be made by the computerized framework. Such an approach may include balancing desired accuracy and computing demand. For example, a method can include determining dimensionality of a plurality of regions in conjunction with determining resources for generating results for a plurality of models of corresponding dimensionalities. As mentioned, a method may include serial and/or parallel processing. As an example, a method may include balancing resources and dimensionality of models such that generated results may be output at a particular time (e.g., or within a particular range of times). In such an example, a simpler model may be solved using lesser computational resources while a more complex model (e.g., dimensionally) may be solved using greater computational resources where times to results generation are approximately matched and where consolidation of results may occur upon such results generation. In such an example, compute cost (e.g., as in a cloud-based computing environment, etc.) may be appropriately balanced with an expected time of results generation.

As an example, a method can include examining a given geological model that includes various associated data, such as trajectory of one or more proposed and/or existing boreholes, geological information (e.g., formation dip, etc.), and various types of measurements (e.g., resistivity, nuclear, acoustic, etc.), to determine one or more model dimensionalities.

Characteristics of tool responses to be modeled, such as depth of investigation (e.g., radially outwardly, etc.) and resolution (e.g., axially and/or radially), may be assessed as factors that can help to determine and/or choose model dimensionality. As an example, a method can include receiving a model interval that corresponds to a physical interval of a subsurface environment. In such an example, the method can include dividing the model interval into a collection of segments or regions (e.g., making a subdivision) where each of the segments or regions is assigned a dimensionality (e.g., as selected from a plurality of different dimensionalities). As an example, neighboring regions can share a certain overlap interval for purposes of splicing together results of the neighboring regions.

As an example, a method can generate an approximated formation model (e.g., a parameterized model) on a per region basis where the model can be consumed by an identified or selected modeling framework. In such an example, one or more approximations can be based in part on a corresponding dimensionality assigned to a particular region.

As an example, for individual regions of a model interval, forward log simulation and/or inversion may be performed by running adequate modeling framework features. In such an example, simulated log responses and/or inversion results from each of the individual regions can be spliced together for the model interval. As to splicing, a method may include utilizing of one or more statistical techniques (e.g., averaging, weighted averaging, etc.), one or more equation fitting techniques (e.g., least squares, line fitting, curve fitting, spline fitting, etc.) and/or one or more other techniques to connect results (e.g., optionally smoothing of results across a model-model boundary). As an example, a model interval may be defined in part by a length along a trajectory of a borehole (e.g., planned, actual, being drilled, being wirelined, etc.). Such a model interval can be heterogeneous as to its structure where such heterogeneity is can be attributed to one or more factors (e.g., formation, trajectory, completion design, fracturing, etc.).

Figure 4:
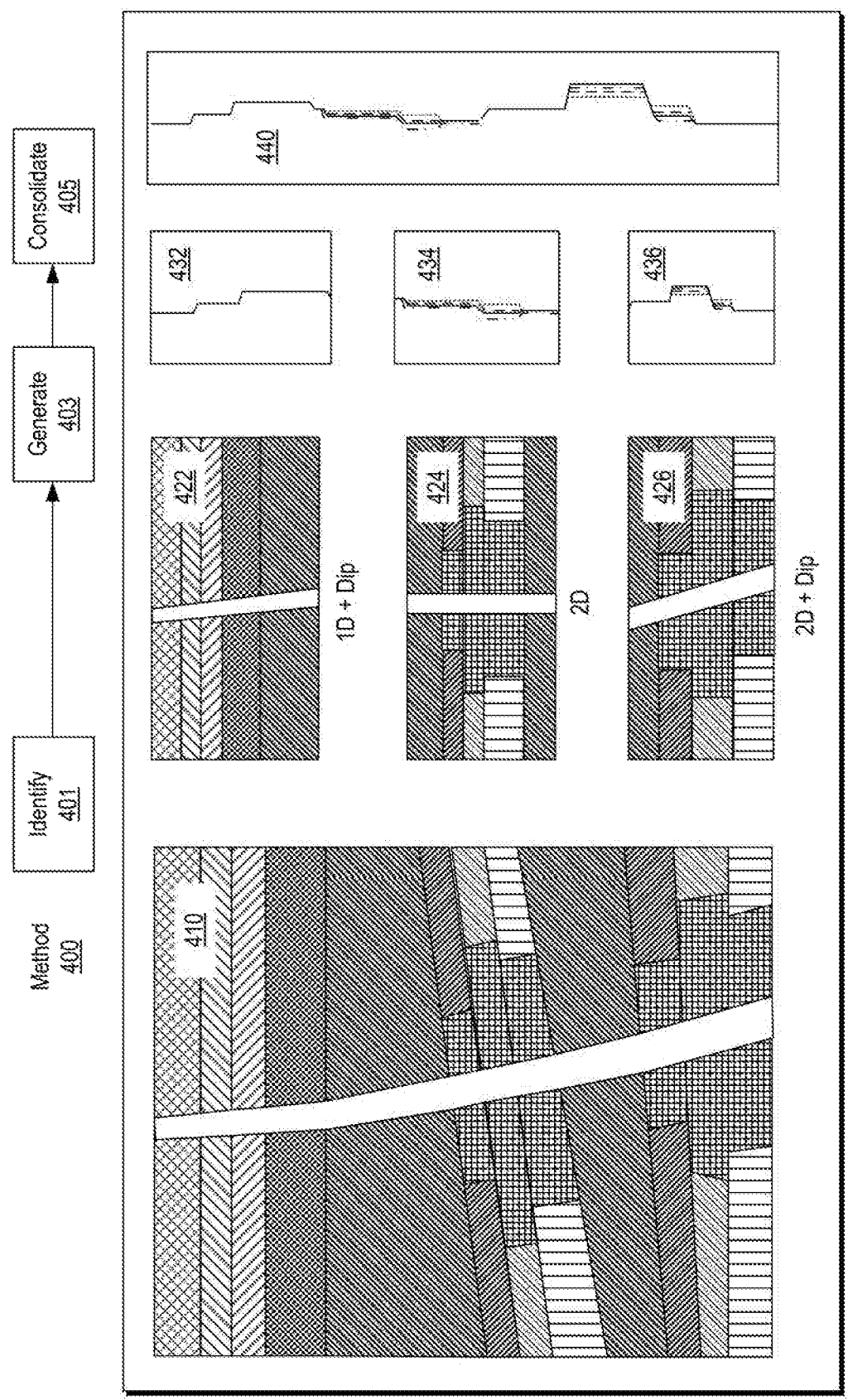
FIG. 4 illustrates an example of a method.

FIG. 4 shows an example of a method 400 that includes an identification block 401 for identifying various sub-regions (e.g., windowing, etc.), a generation block 403 for generating results for the identified sub-regions and a consolidation block 405 for consolidating the results (e.g., splicing together results for the identified sub-regions).

In the example of FIG. 4, the method 400 is illustrated graphically where information for a subsurface region 410 is received and analyzed to identify three sub-regions 422, 424 and 426 and where results 432, 434 and 436 are generated for the three sub-regions 422, 424 and 426, individually. The results 432, 434 and 436 are then consolidated to output results 440 for the subsurface region 410.

In the example of FIG. 4, the subsurface region 410 includes a trajectory (e.g., a representation of a borehole) that passes through various layers. As shown, the sub-region 422 can include five layers, the sub-region 424 can include five layers, and the sub-region 426 can include four layers. In the example of FIG. 4, the sub-regions 422 and 424 can include at least a portion of a common layer and the sub-regions 424 and 426 can include at least a portion of a common layer. Such an approach may be referred to as an overlapping approach, which can provide for consolidation of results with reduced discontinuity as to results of one sub-region with respect to another sub-region; noting that a method may include determining an overlap error, which if greater than a limit, may call for redefinition of one or more sub-regions (e.g., spatially and/or with respect to dimensionality).

The method 400 can be referred to as a workflow, which can be a forward modeling workflow. Such a workflow may be described as including windowing where information for a geometric formation interval is split into small windows according geometric character, trajectory character and/or physical property character. In such an example, after windowing, an associated results generation technique (e.g., forward model-based results generation) can be applied to each window according an associated window character. Such a workflow can then include consolidating the results for the geometric formation interval.

Figure 5:
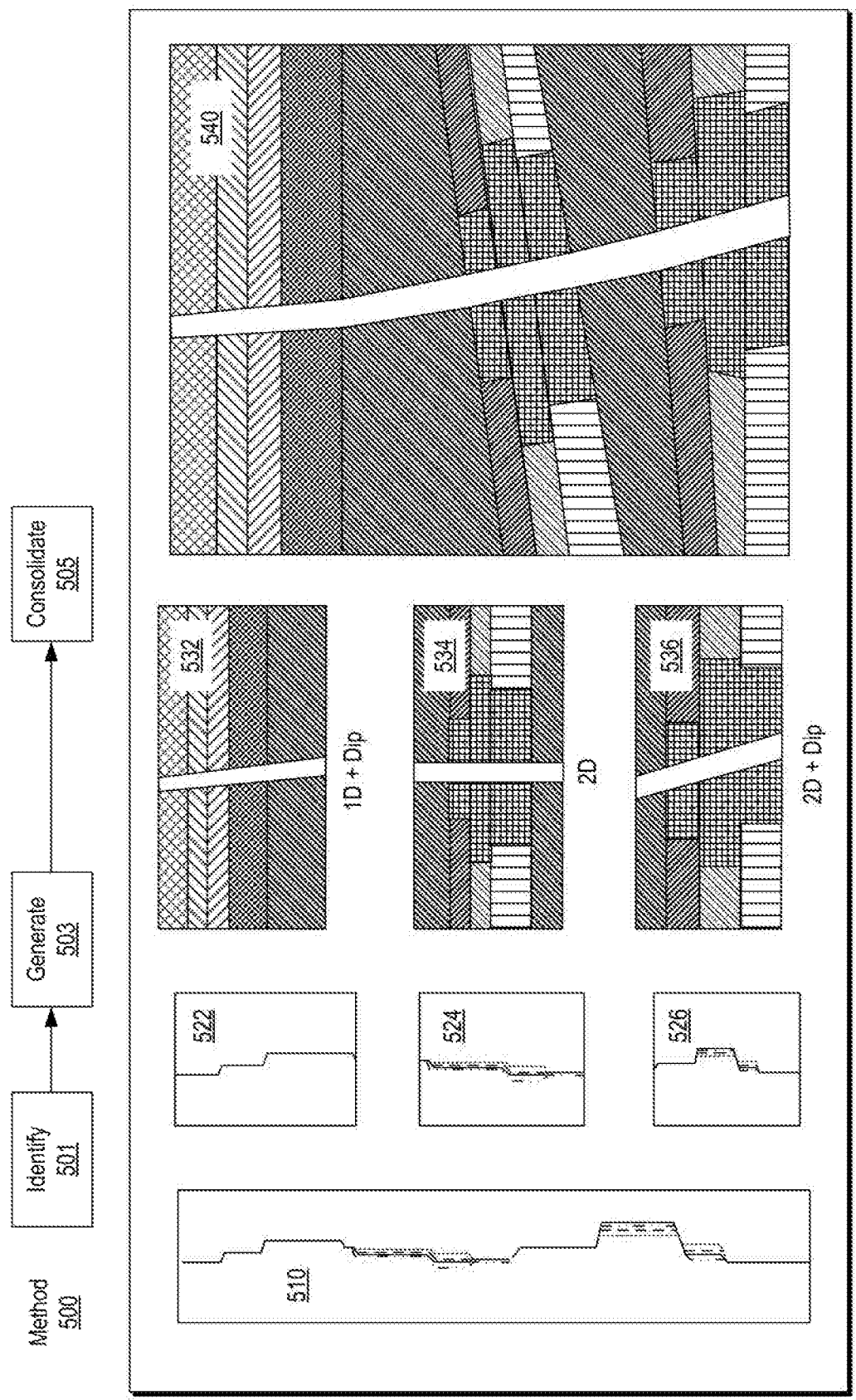
FIG. 5 illustrates an example of a method.

FIG. 5 shows an example of a method 500 that includes an identification block 501 for identifying various sub-regions (e.g., windowing, etc.), a generation block 503 for generating results for the identified sub-regions and a consolidation block 505 for consolidating the results (e.g., splicing together results for the identified sub-regions).

In the example of FIG. 5, the method 500 is illustrated graphically where information for a subsurface region 510 is received and analyzed to identify three sub-regions 522, 524 and 526 and where results 532, 534 and 536 are generated for the three sub-regions 522, 524 and 526, individually. The results 532, 534 and 536 are then consolidated to output results 540 for the subsurface region 510.

The method 500 can be referred to as a workflow, which can be an inversion workflow. Such a workflow may be described as including windowing where information for a geometric formation interval is split into small windows according character of the information (e.g., log information, etc.). In such an example, after windowing, an associated results generation technique (e.g., inversion model-based results generation) can be applied to each window according an associated window character. Such a workflow can then include consolidating the results for the geometric formation interval.

Figure 6:
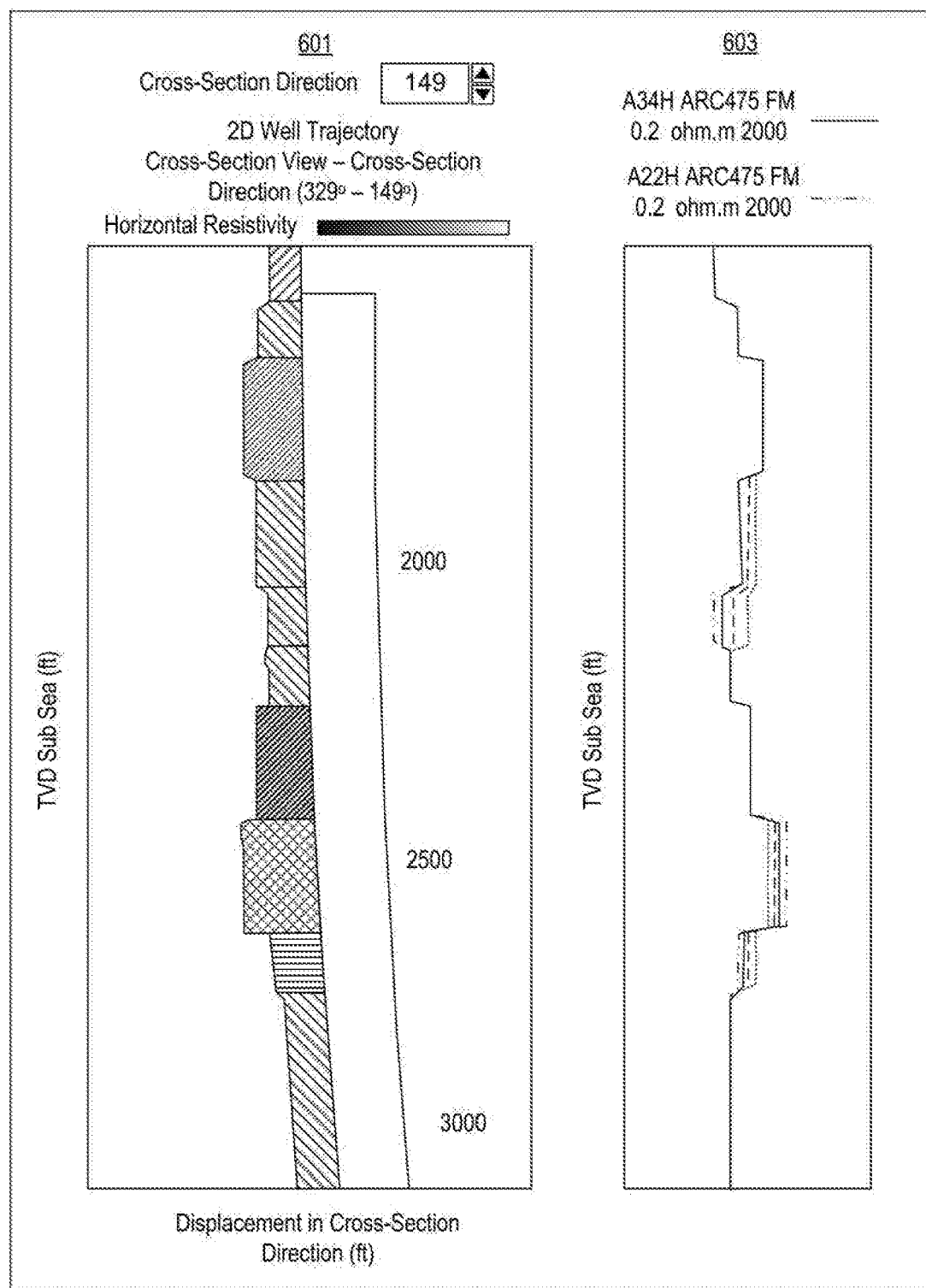
FIG. 6 illustrates examples graphical user interfaces.

FIG. 6 shows examples of graphical user interfaces 600, where one graphical user interface 601 shows geometric and trajectory information for a 2D well trajectory in cross-section (e.g., 329 degrees to 149 degrees, which can be selectable per a graphic control) and where another graphical user interface 603 shows modeling results for the geometry of the GUI 601. In the GUI 601, different colors at different depths can represent different values. As shown in the GUI 601, horizontal resistivity can be represented graphically (e.g., via color, shading, hatching, etc.). As shown, horizontal resistivity can vary with respect to depth and may, for example, differ radially, which may be an indication of an amount of possible fluid invasion, etc. Such information may be utilized to assign dimensionality. For example, where depth of investigation information for different radial depths from an axis of a borehole indicates that fluid invasion exists, a method can include assigning a dimensionality based at least in part on such information. In such an example, one or more regions with corresponding models may be assigned radial dimensionality (e.g., cylindrical model, etc.) or not, depending on the extent of fluid invasion, the consequences of fluid invasion, etc. For example, where a layer is relatively thin, fluid invasion may be limited and of lesser consequence than where a layer is thicker. As an example, angle of a trajectory may have an influence on consequences. For example, where a trajectory is deviated, fluid invasion may potentially lead to a weakening of a portion of a bore wall that may possibly collapse inwardly. In such an example, an assigned dimensionality may provide for radial modeling of such fluid invasion, optionally in combination with one or more mechanical calculations (e.g., as may be indicative of risk of collapse, etc.).

Figure 7:
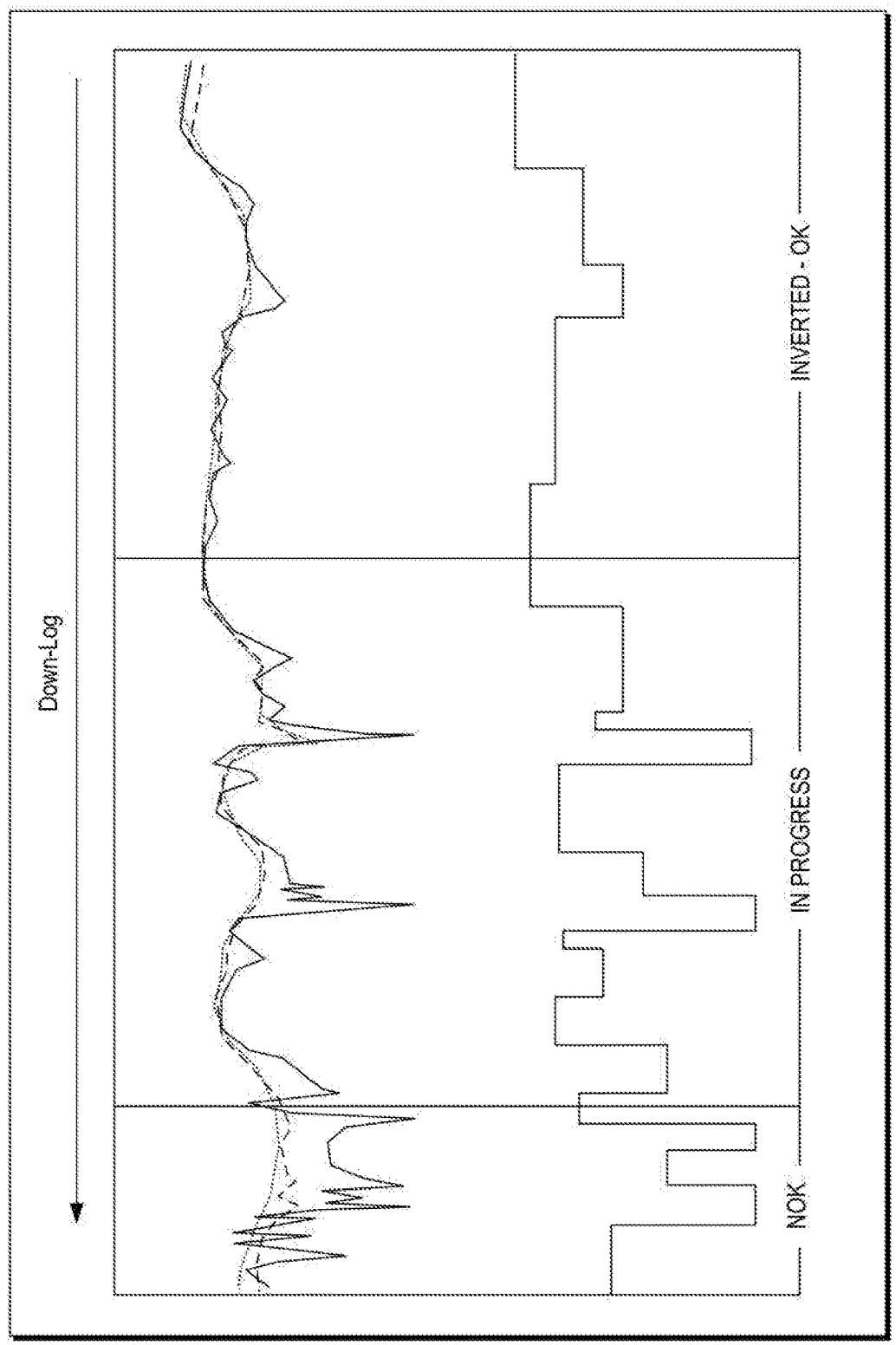
FIG. 7 illustrates an example of a graphical user interface.

FIG. 7 shows an example of a GUI 700 that includes various types of information that can be rendered to a display, for example, during one or more real-time operations (e.g., field operations, etc.). In the example of FIG. 7, the GUI 700 includes a down-log axis that represents distance along a borehole, which can be an interval or intervals. As shown in FIG. 7, the GUI 700 can indicate whether a region is already inverted (e.g., "Inverted—OK"), is being inverted (e.g., "In Progress") or whether particular results are determined to be lacking in quality for one or more reasons ("NOK"). For example, where an inversion fails to converge, the inversion results may be deemed to be inaccurate. As another example, where one or more aspects of inversion results fail to meet one or more quality criteria (e.g., results do not compare favorably to log information), an indication of the quality may be rendered via a GUI to a display. As an example, where a data insufficiency exists, an inversion may be delayed, for example, until sufficient data are acquired, received, etc., upon which the inversion may be performed.

As an example, a method may be performed in a post-job evaluation manner and/or in a real-time manner (e.g., near real-time during operation of equipment in the field). As to real-time, where measurements are from a bottom hole assembly (BHA), some delay time can be expected as a sufficient amount of measurement information may be demanded by a framework to make one or more decisions as to how to identify a region, characterize information, etc. Where a downhole tool can provide suitable look-ahead capabilities and/or where previously acquired information may be available, a delay may be minimal or non-existent. As an example, a method can include forward modeling and/or inverting as to material in a subsurface region ahead of a drill bit of a BHA.

As explained, one or more methods can operate, whether running in post-job and/or real-time, using a layered Earth model (e.g., or "earth model"). Such a model can model one or more subsurface formations with a number of layers (e.g., in series, etc.) where one or more assumptions as to a set of petrophysical properties may be constant within an individual layer (e.g., with respect to a borehole, etc.).

Figure 8:
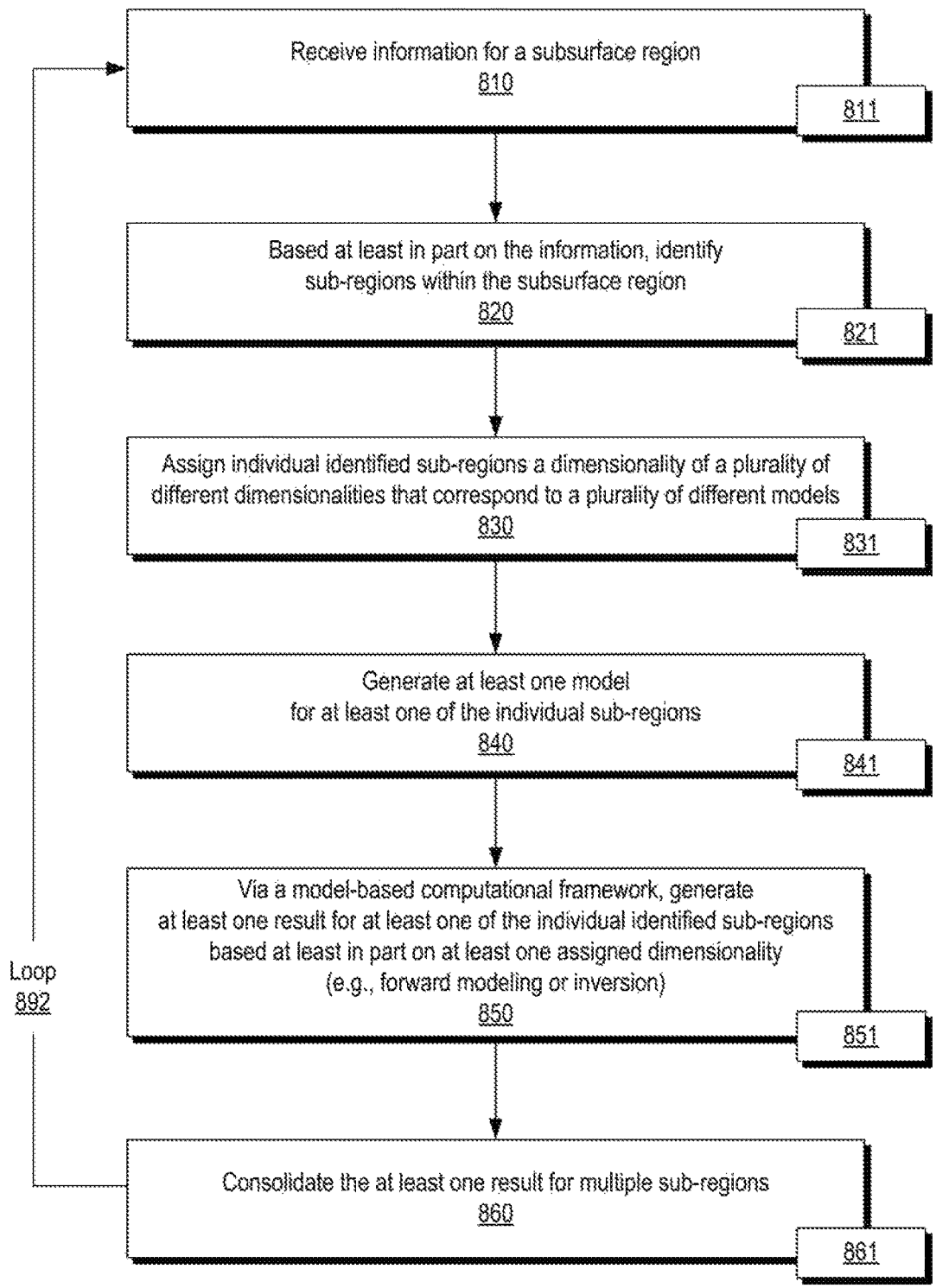
FIG. 8 illustrates an example of a method.

FIG. 8 shows an example of a method 800 that includes a reception block 810 for receiving information for a subsurface region; an identification block 820 for, based at least in part on the information, identifying sub-regions within the subsurface region; an assignment block 830 for assigning individual identified sub-regions a dimensionality of a plurality of different dimensionalities that correspond to a plurality of different models; a generation block 840 for generating at least one model for at least one of the individual sub-regions (e.g., based at least in part on a model with a dimensionality); a generation block 850 for, via a model-based computational framework, generating at least one result for at least one of the individual identified sub-regions based at least in part on at least one assigned dimensionality; and a consolidation block 860 for consolidating the at least one result for multiple sub-regions.

As mentioned, a method may include automatically identifying one or more sub-regions with a subsurface region such that the subsurface region can be represented by a plurality of models where at least some of the models differ in dimensionality with respect to some of the other models. Such an approach may further include provisioning resources (e.g., computational resources) for results generation where such resources may be matched to particularities of an individual model. For example, a more complex model may be provisioned more resources than a model of lesser complexity. As mentioned, resources may optionally be provisioned for generation of results in parallel. For example, consider generating results for a plurality of models at least in part in parallel and then consolidating the results (e.g., at once or according to another basis such as upon availability of results for adjacent regions, etc.).

In the method 800, the generation block 840 can include accessing and/or receiving one or more models, which may be associated with a model-based computational framework. For example, a model-based computation framework can include features to model subsurface regions utilizing different models where such models may differ as to dimensionality. In such an example, once the assignment block 830 assigns dimensionality of an individual sub-region, a model-based computational framework may select, assign, etc., one of a plurality of different models to the individual sub-region. The model selected, assigned, etc., may then be utilized for generation of a result or results for the individual sub-region.

As to the consolidation block 850, where the method 800 includes processing in an iterative manner (e.g., consider adding individual regions iteratively with respect to time), the consolidation block 850 can consolidate the at least one result with another result that has been previously generated. As an example, a prior result may be utilized where the prior result is from a method such as the method 800 or optionally from a different method. For example, where an interval is relatively homogenous, a computational framework may generate a result or results and, where an adjacent interval differs (e.g., introduces heterogeneity), a method such as the method 800 may be utilized, particularly where further heterogeneity may be expected. As an example, at least a portion of the method 800 may optionally be implemented in a real-time manner (e.g., or near real-time manner). For example, consider one or more field operations (e.g., one or more downhole tools) that provide measurements as information upon which one or more actions of one or more of the blocks 810, 820, 830, 840, 850 and 860 of the method 800 may be at least in part based.

In the example of FIG. 8, a loop 892 may be implemented. For example, where information is available over a period of time, once sufficient information is available, as received per the reception block 810, the method 800 may proceed to generate at least one result per the generation block 860 based at least in part on that information. Such a loop may be utilized where information from one or more field operations is being transmitted to an interface of a computing system, which may be a computing system for the model-based computational framework. As an example, where the loop 892 is implemented, the method 800 may include rendering a graphical user interface to a display that indicates progress (e.g., status) of one or more regions and corresponding results, if available (see, e.g., the GUI 700 of FIG. 7).

The method 800 of FIG. 8 includes various blocks 811, 821, 831, 841, 851 and 861 that represent computer-readable storage medium (CRM) blocks or processor-readable medium blocks. Such blocks can include instructions that are computer-executable and/or processor-executable. A computer-readable storage medium is non-transitory, not a signal and not a carrier wave. A computer-readable storage medium is a physical component or components.

As an example, a real-time workflow can include creating and/or adding to a layered earth model as new measurements are acquired, detecting boundaries from the measurements using one or more techniques (e.g., consider a log squaring technique, picking dips and/or boundaries from borehole images, etc.), determining if fluid invasion is sufficiently present or not by comparing deep and shallow readings of measurements (e.g., there can be a separation between an Array Induction Imager Tool (AIT, Schlumberger Limited, Houston, Tex.) resistivity curves depths of investigation (DOIs) AT10 through AT90 (e.g., consider five DOIs at 10 inches (AT10), 20 inches (AT20), 30 inches (AT30), 60 inches (AT60), and 90 inches (AT90)), where one may expect a presence of fluid invasion), enabling one or more radial zones for invasion if warranted, and assigning initial properties for each geological layer and associated radial layers (if present), which can include assigning an average value of corresponding log measurements within a layer.

As an example, the foregoing real-time workflow can further include running an inversion routine of a model-based computational framework to refine the layered earth model (e.g., refine geometry and/or properties of one or more layers in the layered earth model).

As an example, the foregoing real-time workflow can further include monitoring dimensionality (e.g., 1D+Dip, 2D, 2D+Dip, etc.) of a current region to be refined in the layered earth model. In such an example, if dimensionality changes (e.g., according to one or more metrics), such a change may be a trigger that causes running of an inversion. For example, an inversion routing may execute responsive to a determined change in dimensionality where such a change can be based at least in part on information acquired during a downhole operation (e.g., measurement information acquired by one or more downhole tools). As an example, where dimensionality does not differ but where the interval of a current region exceeds a predefined threshold, such an occurrence may be utilized as a trigger to run an inversion routine of a model-based computation framework. As an example, one or more actions of a workflow may be repeated as desired, triggered, etc., to generate a refined layered earth model.

Referring again to the GUI 700 of FIG. 7, when running an inversion workflow, the GUI 700 can indicate a region or regions that have been inverted, a region or regions that are being inverted and/or quality of inversion. As an example, in FIG. 7, the GUI 700 shows a portion of an inversion result that is deemed to be unreliable because measurements or sufficient measurements are yet to be acquired for purposes of model refinement. In such an example, the portion deemed unacceptable may be refined in a subsequent iteration, for example, where additional information is received (e.g., as acquired during an ongoing field operation, etc.).

As an example, a method can include, as a layered earth model is refined in real-time, running a forward modeling routine of a model-based computational framework to compute simulated log measurements (e.g., optionally in real-time). In such an example, a method can include comparing actual and simulated log measurements where, if agreement between the actual and simulated measurements is deemed to be adequate (e.g., per one or more metrics), that may be utilized as an indicator of acceptable quality of the refined earth model (e.g., the refined earth model is an acceptable representation of the actual subsurface formation layers).

The method 800 of FIG. 8 and/or one or more other methods (e.g., workflows, etc.) may be applied to information from one or more of various downhole logging tools (e.g., resistivity, nuclear, density, gamma ray, acoustic, etc.).

Figure 14:
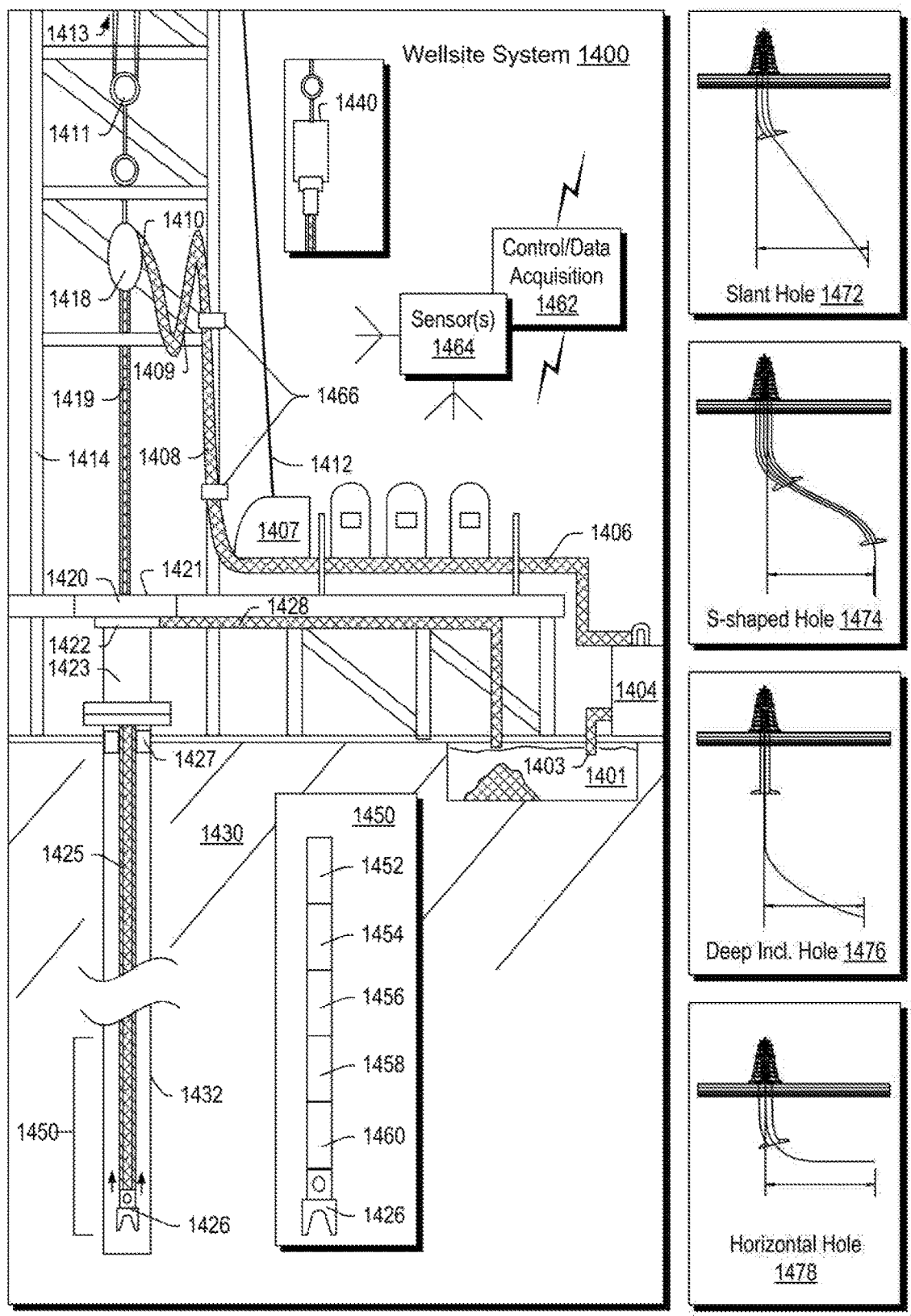
FIG. 14 illustrates examples of equipment including examples of downhole tools and examples of bores.
Figure 15:
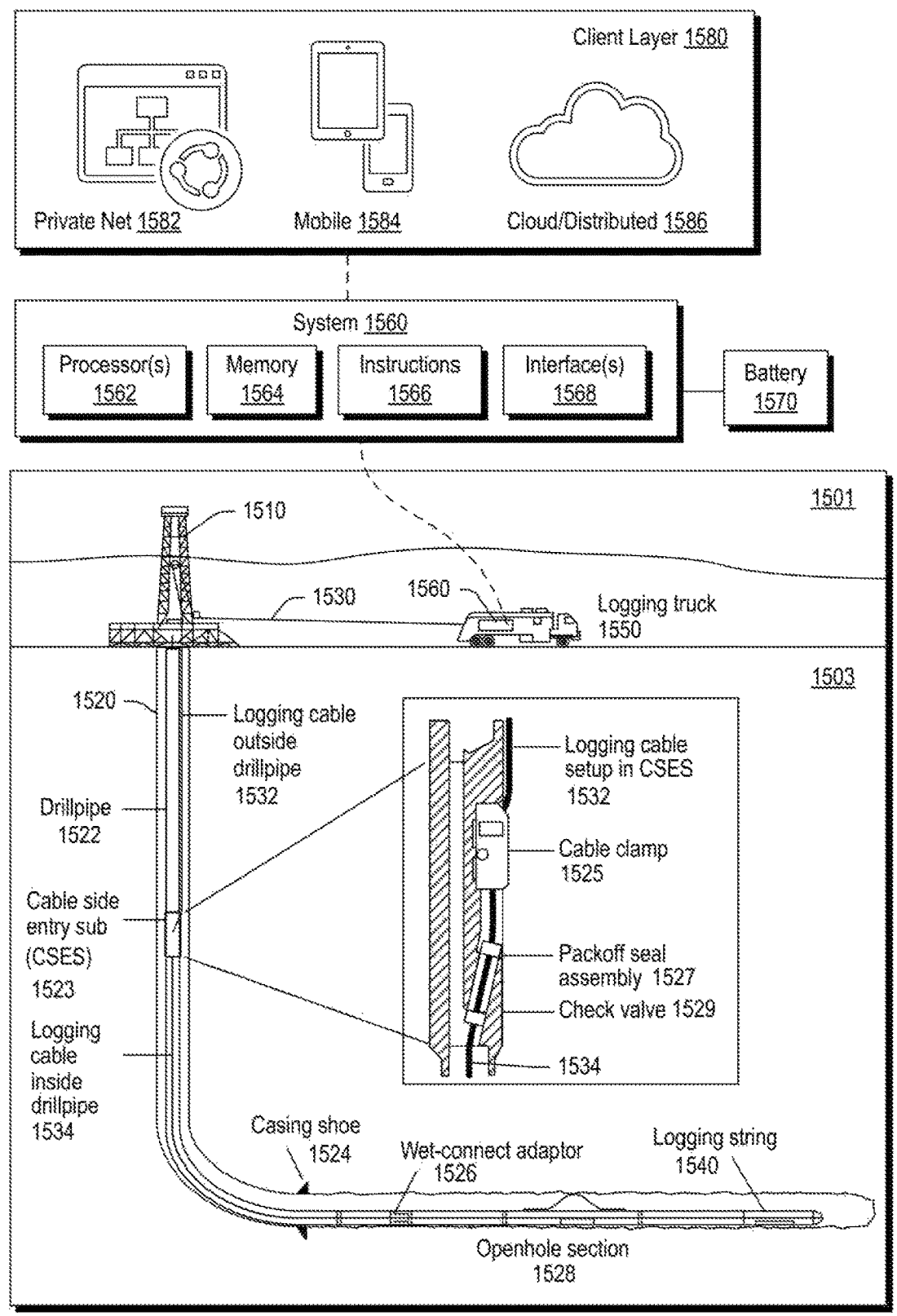
FIG. 15 illustrates examples of equipment including examples of downhole tools.

In such an example, one or more downhole logging tools may be operatively coupled to or be part of a drilling system (see, e.g., FIG. 14) or a wireline system (see, e.g., FIG. 15).

Figure 9:
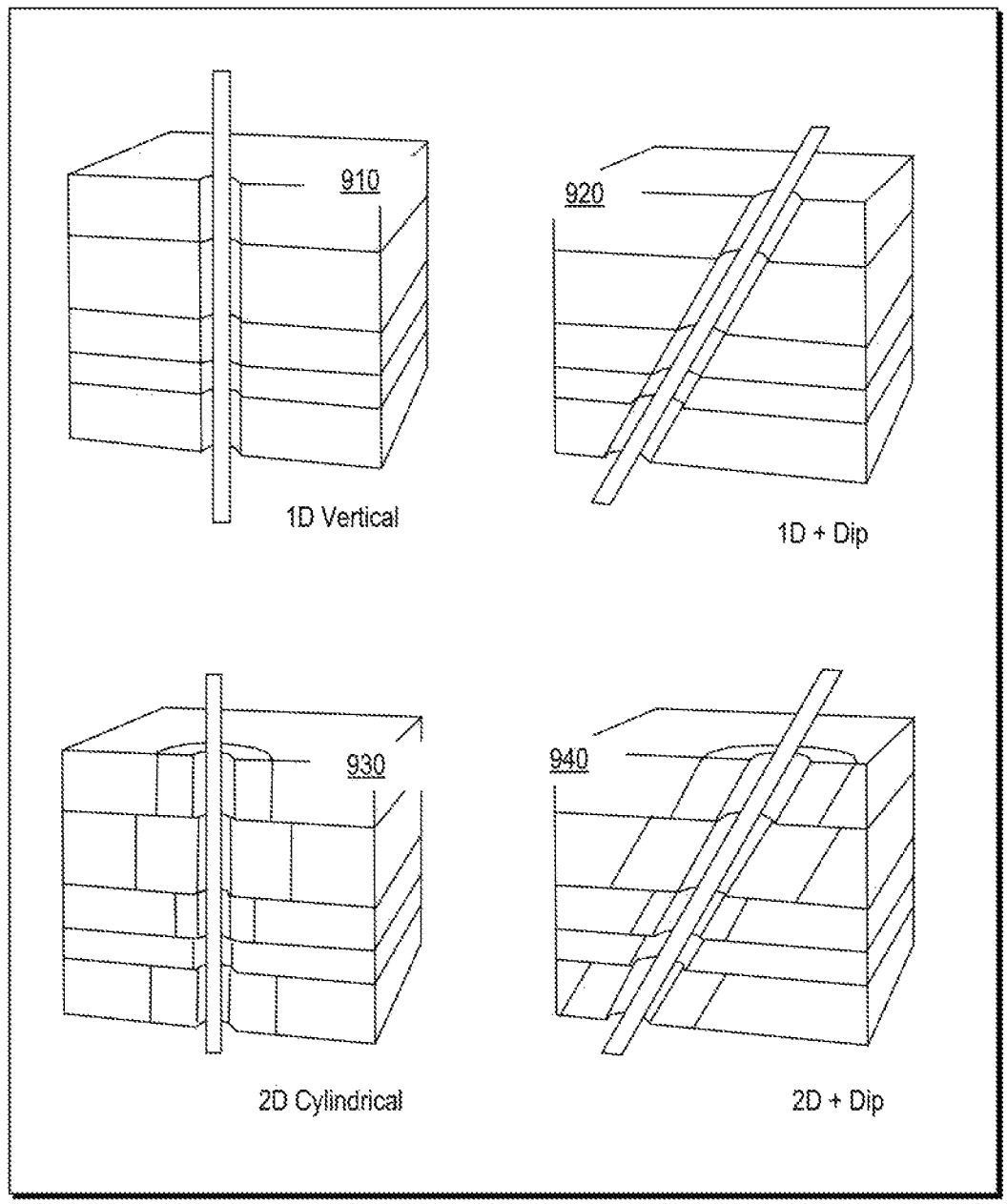
FIG. 9 illustrates examples of models and examples of dimensionality.

FIG. 9 shows some examples of dimensionality 900, including 1D vertical 910, 1D plus dip 920, 2D cylindrical 930 (e.g., radial), and 2D plus dip 940. The boreholes shown in FIG. 9 are some examples of boreholes as a borehole may be curved, at a greater angle (e.g., horizontal), etc. In the examples of FIG. 9, a tool or tool string is illustrated as being disposed at least in part in the boreholes. Such a tool or tool string may optionally include one or more downhole tools (e.g., one or more downhole logging tools, etc.). In the examples of FIG. 9, one or more of the dimensionalities may correspond to an associated model where the model may be adapted via parameters (e.g., parameter values, etc.) of a subsurface region. In such an example, a model may be utilized in a computational framework to generate results. As an example, such results may be consolidated with results generated from one or more other models (see, e.g., FIGS. 4 and 5).

Figure 10:
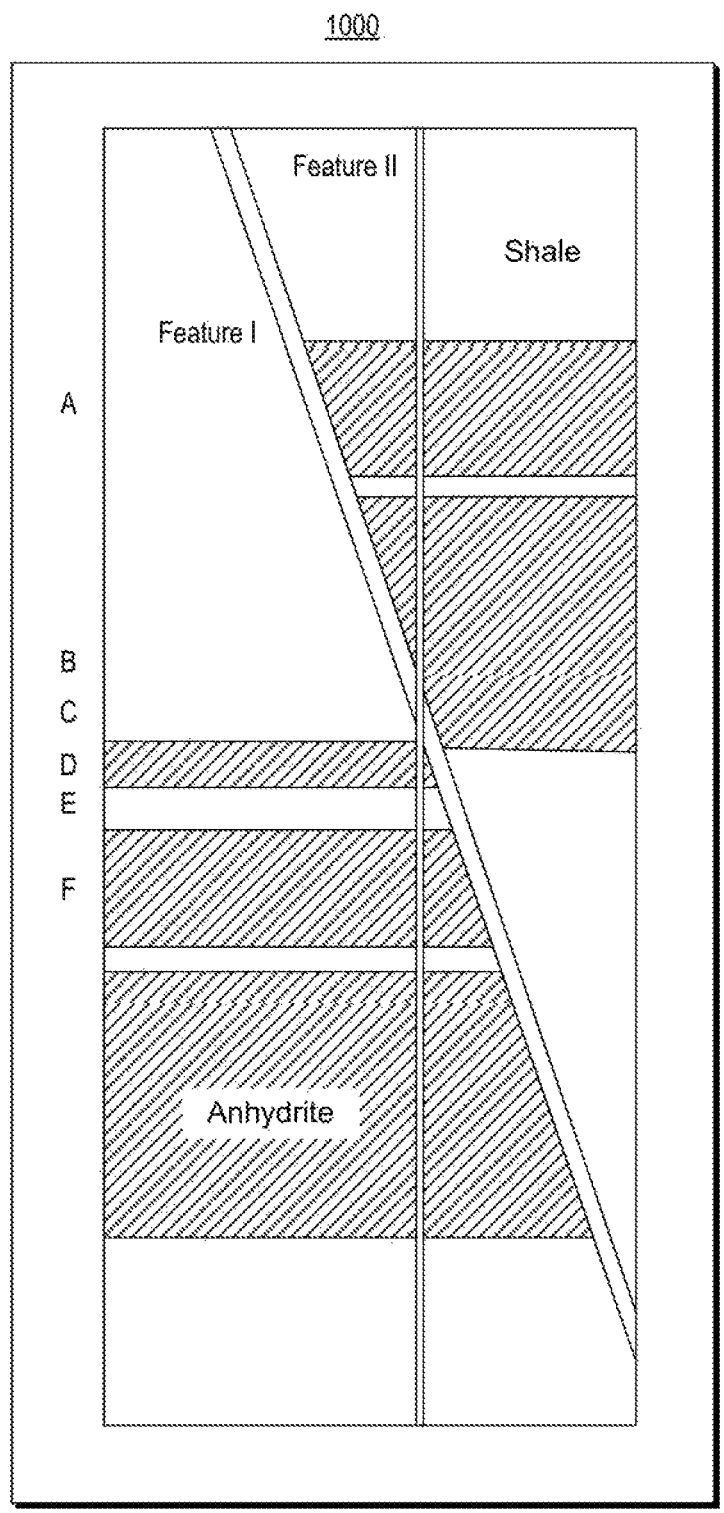
FIG. 10 illustrates an example of a model.

FIG. 10 shows an example of a 2D Cartesian model 1000. As shown in FIG. 10, a 2D Cartesian model of a region of a formation can specify different types of materials, different types of features, etc. In the example of FIG. 10, materials such as shale and anhydrite are identified, where properties of such materials can be assigned to (e.g., associated with) physical locations represented by the 2D Cartesian model 1000. The 2D Cartesian model 1000 can include various features such as Feature I and Feature II. One or more features may be structural and represented in one or more models.

As to model dimensionality, various formation model dimensionalities may be used for forward log simulation and inversion workflows. As shown in FIG. 9, these can include a parameterized model with one or more of a 1D vertical model, a 1D+dip model, a 2D cylindrical (radial) model and a 2D+dip model (2D+Dip). For non-parametric models, consider, for example, one or more of a 2D Cartesian model (2D Cartesian), or a general 3D model (3D) may be used. Dimensionality Definitions May Include:

A 1D Vertical model (1D Vertical) which includes: parallel geological layers; straight line trajectory (constant inclination and azimuth) perpendicular to the geological layers (e.g., approximately 0 degrees relative dip); and no invasion.

A 1D+Dip Cartesian model (1D+Dip), which includes: parallel geological layers, straight line trajectory (e.g., approximately greater than 0 degrees to approximately 90 degrees relative dip); and no invasion.

A 2D Cylindrical model (2D Radial), which includes: parallel geological layers; radial cylindrical layers within each geological layer; straight line trajectory perpendicular to the geological layers (e.g., approximately 0 degrees relative dip); and radial layers that represent invasion profile and borehole.

A 2D+Dip model (2D+Dip), which includes: parallel geological layers; radial cylindrical layers within each geological layer; straight line trajectory (e.g., approximately greater than 0 degrees to approximately 90 degrees relative dip)

A 2D Cartesian model (2D Cartesian), which includes, for example, one or more of: geological layers that do not have to be parallel to each other; model unconformities; faults; one or more other complex geometry; and no substantial invasion. Such a model may include assumption as to infinite extension of the same geometry perpendicular to the 2D model plane (extrusion).

A General 3D model (3D), which includes, for example, one or more arbitrary 3D geological objects that can be defined.

As to other model factors, in addition to the geometrical dimensionality described above, primarily based on geological layers (1D or non-1D), such other model factors can include one or more of borehole fluid or fluids inside a borehole and anisotropy. As an example, as to dip, one or more dip limits may be defined and utilized in selection of a model. For example, while above greater than approximately 0 degrees is mentioned, a dip limit of a different number of degrees may be set as a criterion for assignment of a dip-based dimensionality (e.g., greater than approximately 5 degrees, greater than approximately 10 degrees, etc.), which may account for accuracy of results, optionally balanced against one or more factors associated with computational demand.

As an example, for log simulation of certain measurement types, such as nuclear and laterolog, aspects to consider can include properties of borehole fluids (e.g., mud properties, drilling fluid properties, treatment fluid properties, etc.) and borehole size (e.g., azimuthal caliper or constant bit size). One or more types of invasion profiles may be considered (e.g., step, ramp, annulus profiles, etc.). For measurements with multiple depths of investigation (DOIs), invasion may be considered for modeling log responses. As an example, an invasion profile may include one or more of the following for use in modeling: a step profile where a single radial boundary separates invaded and virgin zones; an annulus profile where radial boundaries are to separate invaded, annulus and virgin zones; a radial ramp profile where one or more formation properties change gradually from invaded to virgin zone; a vertical ramp profile where formation properties may change vertically within a layer due to gravity.

As mentioned, anisotropy may be considered as a factor to identify a sub-region and/or to select, assign, etc., a model. For some measurements such as resistivity, anisotropy can be considered where the measurement can respond differently within a medium (e.g., a relatively homogeneous medium) depending on a relative angle to a formation. As an example, formation properties may be distinguished to be parallel to and perpendicular to a layer boundary and referred to as a horizontal property and a vertical property, respectively. For example, consider horizontal resistivity (Rh) and vertical resistivity (Rv) being utilized to handle anisotropic resistivity by a model-based computational framework; noting that some examples of horizontal resistivity (Rh) are illustrated in FIG. 6.

As an example, a method can include inputting a geological model and subdividing a model interval into sub-regions and determining a dimensionality of each sub-region. As an example, primary inputs can include trajectory data and geological (e.g., formation dip and azimuth or dip set) data. As an example, one or more auxiliary inputs, such as resistivity measurements, structural dip interpretation, invasion analysis, may be used to refine one or more outputs.

As an example, a method can include identifying a sequence of formation layers (e.g., a stratigraphic sequence) that are nearly parallel to each other and subdividing an entire interval into a series of 1D sub-regions.

As an example, a sequence of formation layers may be identified that are nearly parallel to each other, which can define an interval (e.g., a region) that can be subdivided into a series of 1D sub-regions. As an example, a method can include receiving a dip set of information that includes layer boundary locations in measured depth (MD) and true formation dip and azimuth at each boundary. From the true formation dip and azimuth in the dip set, a method can include determining a vector normal to each layer boundary and comparing vectors to identify a sequence of boundaries that are approximately parallel each other to form a series of 1D sub-regions (see, e.g., FIGS. 4 and 5).

As an example, within an individual 1D sub-region, layers can be considered to be parallel for purposes of modeling (e.g., for a parameterized formation model).

As an example, a method can include accounting for one or more types of features. For example, if layer boundaries are defined as polylines in a 2D plane or polygons in a 3D space, an averaged orientation of a layer boundary may be used. In such an example, a target measurement to be modeled may be chosen beforehand. As an example, a volume of investigation of a measurement may be used to compute the averaged orientation of each layer boundary in the vicinity of a tool path.

As an example, if resistivity is found to be substantially that of the target measurement to be modeled, a 1D'ness check, whether neighboring layers are approximately parallel or not, can be refined by checking resistivity contrast around each of the boundaries. As an example, a primary boundary may be defined as a boundary that has the largest resistivity contrast between layers around it. As an example, a method can include comparing orientations of neighboring boundaries to that of a primary boundary and determining whether one or more of those belong to the same 1D region as the primary one. Such a process may be repeated, as appropriate, for example, for a remaining number of regions, intervals, etc. (e.g., until the remaining number is reduced to zero).

As an example, if a structural dip analysis result is available in a dip set, the result can be used to refine the behavior of a method. For example, a structural dip analysis can differentiate structural dips from local dips such as those from fracture(s). As an example, when performing one or more 1D'ness checks, one or more additional numerical weights can be placed on one or more structural dips in order to filter out local dips.

As an example, a 1D'ness check can be refined if attributes of measurements to be modeled, such as vertical resolution, volume of investigation, azimuthal or not, etc., are known in advance (e.g., known a priori).

After performing one or more processes, there may be one or more remaining regions or intervals that do not fit into a 1D region classification, for example, due to one or more geological complexities (e.g., layers with fault, unconformity, channel sand, salt dome, etc.). In such an example, the remaining "non-1D" regions or intervals may be considered for classification as one or more of a 2D Cartesian model or a 3D model, for example, depending on how an initial geological model may be defined. For example, if an initial geological model is described as a 2D curtain section and the model is not 1D layering, the model may be treated as 2D Cartesian. In some instances, there may be no general way to parametrize one or more underlying non-1D model regions, and therefore these regions may be handled (e.g., classified) separately from one or more 1D regions. Handling of such cases can be specific to one or more features of a computational framework that can consume a complex model definition.

As an example, a method can include dividing one or more regions if inclination and azimuth of trajectory changes more than one or more limits, which may be predefined.

As an example, a forward modeling framework may specify that a tool path, along which a tool response is simulated, is to be a straight line (e.g., linear tool path). In such an instance, a 1D region may be divided into sub-regions within which the trajectory is approximately straight. In such an example, a 1D region may be an identified region of an interval and hence a sub-region where within that sub-region one or more sub-sub-regions are identified and defined. One or more criteria for a trajectory within a region (or sub-region, etc.) being straight may be determined, for example, by a maximum change in azimuth and inclination of a trajectory segment in the region (e.g., or sub-region, etc.).

As mentioned, a method can include determining dimensionality for a plurality of regions, sub-regions, etc. As an example, a method can include determining dimensionality of an individual region or sub-region based on one or more of the following criteria.

1D+Dip 1D regions may be initially categorized as "1D+Dip" unless there is a reason for "1D Vertical" or "2D Cylindrical" models, due to some modeling capability concerns. For example, if modeling "1D+Dip" is available and limitations as to computing resources (e.g., speed, etc.) are not in place, a "1D Vertical" can be modeled as "1D+Dip"; noting that such an approach may be applicable to "2D Cylindrical" versus "2D+Dip" (see, e.g., FIG. 9).

1D Vertical

If an angle between a trajectory and a normal (normal vector) to layers is less than a predefined angle (e.g., approximately 20 degrees to approximately 30 degrees, depending on the physics of the tool, which may be triaxial, coaxial, etc.), the trajectory may be considered to be vertical for modeling purpose. In such a case, a region can be treated as 1D vertical. As mentioned above, "1D Vertical" can be utilized where there is no modeling capability for "1D+Dip" or "2D+Dip" for the target measurement type (see, e.g., FIG. 9).

2D Cylindrical/2D+Dip

As an example, a measurement with multiple depths of investigation can indicate presence of invasion (e.g., invasion of one or more fluids into medium or media that is adjacent to or within a distance of a borehole). As an example, where there are noticeable differences in measurements between shallow and deep sensing (e.g., at a common measured depth or within a range of measured depths), the formation layers adjacent to the borehole are most likely invaded by one or more borehole fluids. In such an example, a region (e.g., or sub-region) can be modeled with invasion in an effort to obtain more accurate log responses (see, e.g., FIG. 9). As an example, where invasion is to be considered, "1D Vertical" may be treated as "2D Cylindrical" and "1D+Dip" as "2D+Dip", respectively.

As an example, a method can include generating an approximated model on a per region basis (e.g., sub-region by sub-region). In such an example, the method can include generating an approximated model description for each region (e.g., sub-region) that can be consumed by a model-based computational framework. Such an approximation can be based at least in part on the dimensionality assigned to each region (e.g., sub-region).

As an example, a method can include determining orientation of layers. For example, a method can include determining whether layers in a region are nearly parallel each other or not. Such a method may include a parameter or parameters that can be in a number of degrees, etc. For example, where a normal (e.g., normal vector) can be determined for each of two layers, the normals may be compared to determine a difference, which may include a 180 degree factor if the normals point in opposing directions (e.g., outward normals with respect to a volume of material or materials). As an example, a parameter may be about 1 degree to about 10 degrees or more as to an indication of paralllelness. As an example, a common orientation for layers, namely true formation dip and azimuth angles, may be determined. As an example, if resistivity is to be modeled, a layer boundary bounding the layers with highest resistivity contrast may dictate the orientation of one or more other layers. Otherwise, for example, vectors normal to the layers can be averaged to compute the orientation.

As an example, a method can include consolidating one or more additional layer boundaries. As an example, one or more layer boundaries can be utilized for purposes of identification of a region, a sub-region, etc., which may be classified as major geological boundaries, which may be associated with dip information (e.g., as obtained from a geological dip interpretation workflow).

As an example, one or more additional layer boundaries may be based on information such as log information. For example, consider one or more square log boundaries obtained from an automatic log squaring of a particular log measurement. Such one or more boundaries may be consolidated into existing major boundaries.

As an example, a method can include extending a region to create overlap(s) with one or more neighboring regions. As an example, to help to assure a smooth transition from one region or sub-region to the next when splicing log responses, one or more regional overlaps can be defined. As an example, an amount of overlap can depend on a volume of investigation (VOI) of a measurement to be modeled. As an example, overlap can depend on size of a VOI where as VOI increases, overlap increases. In such an approach, a few layers from above and below can be added. For example, consider the illustrated regions of FIGS. 4 and 5 where each of the identified sub-regions includes layers. Results may be combined on a layer basis to assure that linking of adjacent layers in separate regions/sub-regions occurs for forward modeling and/or inversion.

Figure 11:
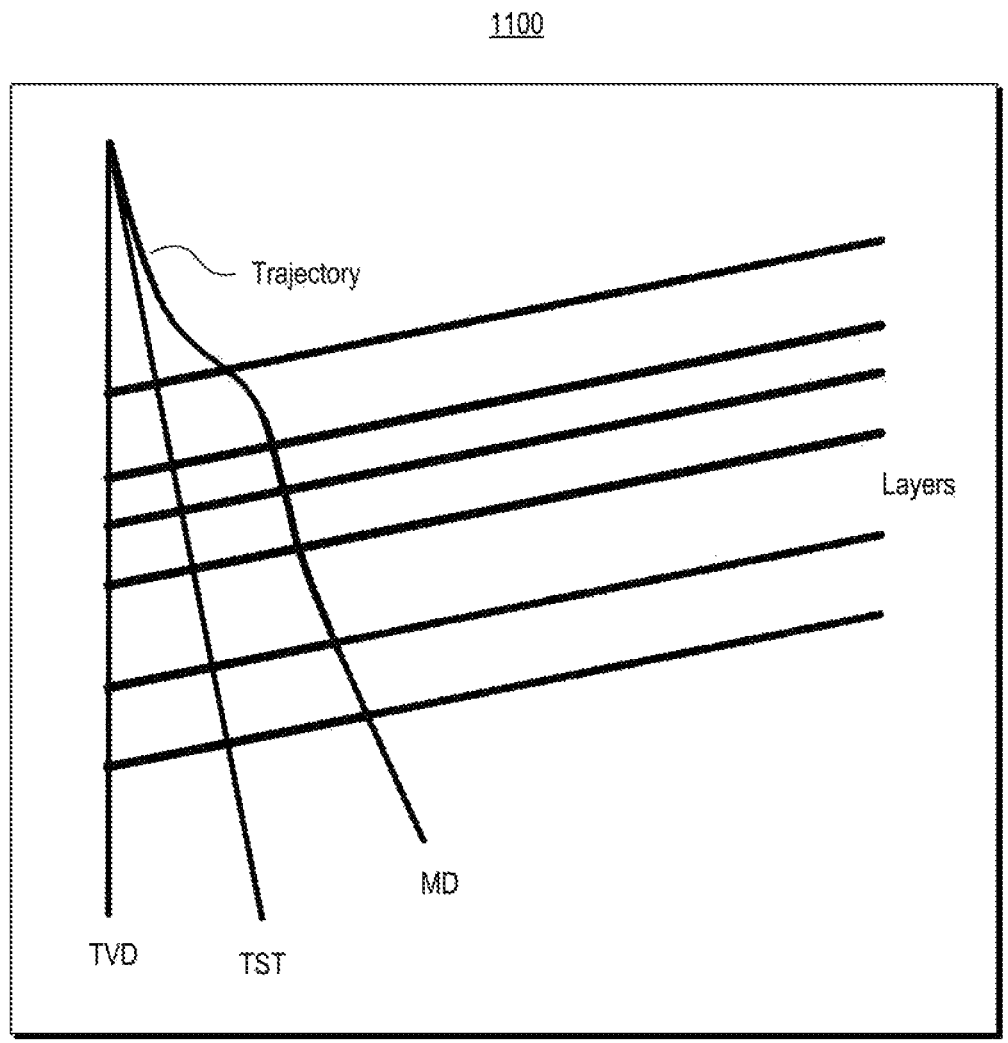
FIG. 11 illustrates an example diagram of true stratigraphic thickness.

FIG. 11 shows an approximate diagram 1100 of various layers with respect to true vertical depth (TVD) and measured depth (MD) of a trajectory (e.g., a borehole trajectory). The diagram 1100 also includes a true stratigraphic thickness (TST) indicator. As an example, a method can include determining position of layers in a true stratigraphic thickness (TST) space.

As an example, layer boundary positions may be defined along a trajectory in measured depth (MD). Such layers may be assumed to be crossing the trajectory at various MD points and such layers may be assumed to be parallel to each other, where orientation (e.g., formation dip and azimuth) has been determined. From such information, true stratigraphic thickness (TST) may be computed.

Referring to the diagram 1100 of FIG. 11, TST is shown as a cumulative depth index whose axis is perpendicular to the layers (e.g., at 90 degrees to a planar surface of a layer). As an example, a TST reference point (e.g., a zero TST depth point) may be chosen arbitrarily or otherwise and thickness of each layer cumulated from the reference point. As an example, a method can include converting MD to TST for a given set of layers with dip and azimuth information plus well deviation survey data. As an example, bed boundary positions defined in TST can be an input to a forward modeling framework. As an example, a method can include storing a TST-MD relation (e.g., in memory) as the depth index can be converted back to MD (e.g., for visualization, output, etc.).

As an example, a method can include approximating a trajectory by a straight line and computing apparent dip. If a target forward modeling routine assumes that an input trajectory is to be straight (e.g., constant inclination and azimuth), a method may approximate the trajectory with a straight line (e.g., a linear trajectory). Such an approximate straight line trajectory may intersect with layer boundaries at different points, however, the sum of square distance between the original and new crossing points may be minimized to honor original crossing points.

Figure 12:
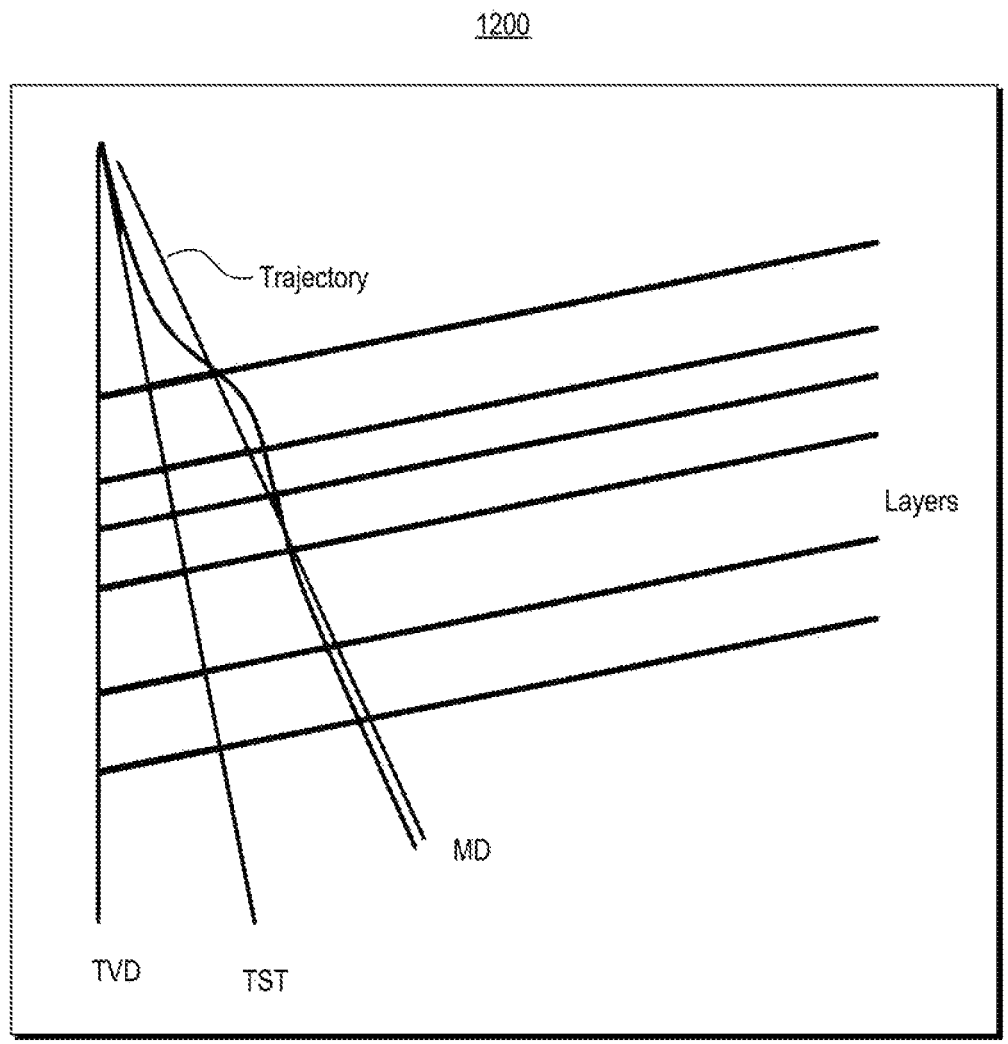
FIG. 12 illustrates an example diagram of a trajectory with respect to layers and measured depths.

FIG. 12 shows an example of a diagram 1200 that illustrates a straight line trajectory (e.g., straight line approximation) that may be utilized in computing apparent dip. As shown in FIG. 12, the straight line trajectory intersects the various layers along with measured depth. In such an example, the angle between the normal (e.g., normal vector) to the formation layers and the approximate trajectory is the apparent dip, which can be passed as input to a "1D+Dip" model. In such an example, if this region is identified as being "1D Vertical", then the apparent dip may be considered to be zero.

As an example, a method can include adding a borehole model. For example, if a modeling routing specifies information about a borehole to be modeled, a method can include adding borehole information such as borehole size, borehole fluid properties, etc. As an example, a borehole may be modeled as a constant radius cylinder around a borehole filled with one or more fluids (e.g., mud, etc.) that may have certain impacts on simulated log responses. As an example, if an accurate description of a borehole shape is specified for cases like nuclear modeling, a borehole may be represented as caliper (e.g., wireline) or azimuthal caliper (logging while drilling, "LWD"). As an example, eccentricity may be considered with respect to the shape of a borehole for purposes of borehole modeling.

As an example, a method can include adding an invasion model for "2D Cylindrical" and "2D+Dip". For example, a method can include adding an invasion model to formation layers where invasion is deemed to be present. As an example, an invasion model can be represented as a series of radial layers in each of a plurality of geological formation layers. For example, a step invasion profile can be defined to include two radial layers, invaded and virgin; whereas, a annulus can include three radial layers, invaded, annulus and virgin.

As an example, a model-based computational framework may utilize one or more existing applications that are capable of computing invasion parameters such as invasion diameter (DI), formation properties in invaded and virgin zones, etc. depth by depth. For each layer where invasion is present (e.g., a DI that is greater than a threshold value), a method may average each of the individual properties and assign constant property value per radial layer. Such an approach may be utilized for purposes of forward modeling and/or inversion.

As an example, when modeling a ramp profile, and/or gravity segregation, geological layers and radial layers may be further refined (e.g., divided) to allow for population of distinct property values in each modeling ring, cell, etc. As to gravity segregation, it refers to a tendency of fluids to stratify into different layers due to gravity. In gravity segregation, a heaviest fluid may settle near a bottom of a region and a lightest fluid may rise to a top of a region (e.g., a reservoir region, etc.). As an example, a method can include accounting for gravity and movement of fluid and/or material due at least in part to gravity.

As an example, a method can include adding one or more radial layers in one or more geological formation layers that may be a "1D Vertical" model, a "2D Cylindrical" model, and "1D+Dip" model, or a "2D+Dip" model.

As mentioned, a method can include assigning each sub-region of a plurality of sub-regions a dimensionality and a model description that is based at least in part on dimensionality. As an example, a forward modeling routine or an inversion routine of a computational framework can include features that are compatible with assigned dimensionalities, for example, to consume a model description and perform its task to generate results. On completion of results generation, each sub-region has its own set of outputs (e.g., forward modeling results or inversion results).

As mentioned, a method can include splicing results from a plurality of sub-regions together to generate a composite result, which may be based at least in part on overlap.

As an example, results from each sub-region processed can be spliced together, either at once or discretely (e.g., iteratively, etc.). As mentioned, a method can include sub-regions that include overlaps, where results in each sub-region, whether it is simulated log responses from forward modeling or inverted parameters from inversion, can be processed to provide a smooth transition from one sub-region to the next.

As an example, a method can include relaxing criteria for layer boundaries being parallel to each other and a trajectory having constant inclination and azimuth, as such criteria, if strictly enforced, may tend to create in some instances many small 1D sub-regions (e.g., one for each sampling point). As an example, a method can include, assuming that an underlying model is at an appropriate scale free from non-1D features such as fault, unconformity and pinch-out, performing forward modeling or inversion using a 1D region per point to give accurate results. However, such an option may demand substantial computing resources and/or substantial computational time, which may make it unsuitable in various scenarios such as, for example, one or more real-time scenarios. As mentioned, a method can include utilizing a model with lower dimensionality where applicable (e.g., according to one or more criteria) while optimizing the size of a 1D sub-region for achieving a desirable balance between accuracy of results and computational performance.

Figure 13:
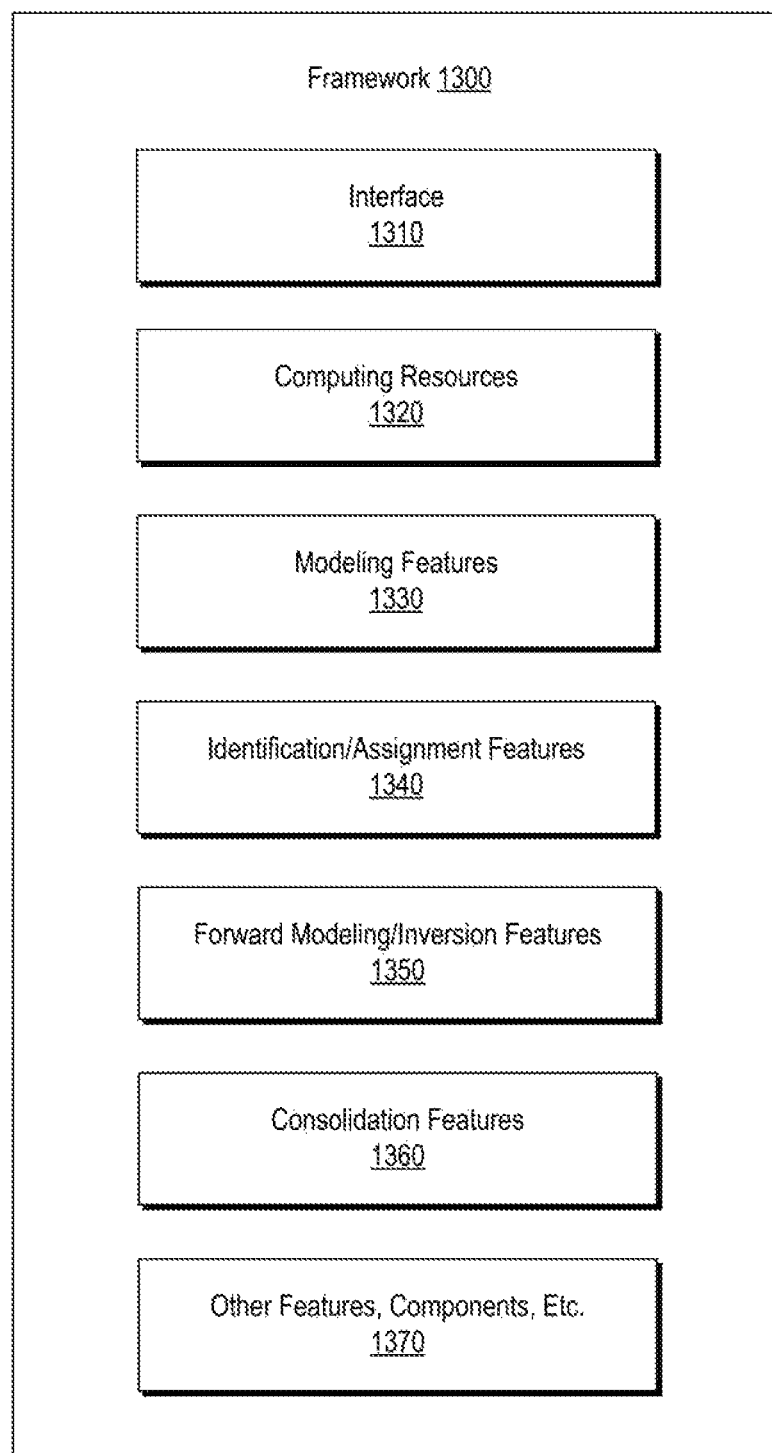
FIG. 13 illustrates an example of a computational framework.

FIG. 13 shows an example of a computational framework 1300 that includes one or more interfaces 1310, computational resources 1320 (e.g., memory, one or more processors, etc.), modeling features 1330, identification and assignment features 1340, forward modeling and/or inversion features 1350, consolidation features 1360 and one or more other features, components, etc. 1370. As an example, the computational framework 1300 can be a model-based computational framework that can perform one or more actions of the method 800 of FIG. 8 and/or one or more other methods associated with forward modeling and/or inversion. As an example, one or more components of the computational framework 1300 may be utilized to automatically analyzing information to identify sub-regions and assign dimensionality to each of the identified sub-regions.

FIG. 14 shows an example of a wellsite system 1400 (e.g., at a wellsite that may be onshore or offshore). As shown, the wellsite system 1400 can include a mud tank 1401 for holding mud and other material (e.g., where mud can be a drilling fluid), a suction line 1403 that serves as an inlet to a mud pump 1404 for pumping mud from the mud tank 1401 such that mud flows to a vibrating hose 1406, a drawworks 1407 for winching drill line or drill lines 1412, a standpipe 1408 that receives mud from the vibrating hose 1406, a kelly hose 409 that receives mud from the standpipe 1408, a gooseneck or goosenecks 1410, a traveling block 1411, a crown block 1413 for carrying the traveling block 1411 via the drill line or drill lines 1412, a derrick 1414, a kelly 1418 or a top drive 1440, a kelly drive bushing 1419, a rotary table 1420, a drill floor 1421, a bell nipple 1422, one or more blowout preventors (BOPs) 1423, a drillstring 1425, a drill bit 1426, a casing head 1427 and a flow pipe 428 that carries mud and other material to, for example, the mud tank 1401.

In the example system of FIG. 14, a borehole 1432 is formed in subsurface formations 1430 by rotary drilling; noting that various example embodiments may also use directional drilling.

As shown in the example of FIG. 14, the drillstring 1425 is suspended within the borehole 1432 and has a drillstring assembly 1450 that includes the drill bit 1426 at its lower end. As an example, the drillstring assembly 1450 may be a bottom hole assembly (BHA).

The wellsite system 1400 can provide for operation of the drillstring 1425 and other operations. As shown, the wellsite system 1400 includes the platform 1411 and the derrick 1414 positioned over the borehole 1432. As mentioned, the wellsite system 1400 can include the rotary table 1420 where the drillstring 1425 pass through an opening in the rotary table 1420.

As shown in the example of FIG. 14, the wellsite system 1400 can include the kelly 1418 and associated components, etc., or a top drive 1440 and associated components. As to a kelly example, the kelly 1418 may be a square or hexagonal metal/alloy bar with a hole drilled therein that serves as a mud flow path. The kelly 1418 can be used to transmit rotary motion from the rotary table 1420 via the kelly drive bushing 1419 to the drillstring 1425, while allowing the drillstring 1425 to be lowered or raised during rotation. The kelly 1418 can pass through the kelly drive bushing 1419, which can be driven by the rotary table 1420. As an example, the rotary table 1420 can include a master bushing that operatively couples to the kelly drive bushing 1419 such that rotation of the rotary table 1420 can turn the kelly drive bushing 1419 and hence the kelly 1418. The kelly drive bushing 1419 can include an inside profile matching an outside profile (e.g., square, hexagonal, etc.) of the kelly 1418; however, with slightly larger dimensions so that the kelly 1418 can freely move up and down inside the kelly drive bushing 1419.

As to a top drive example, the top drive 1440 can provide functions performed by a kelly and a rotary table. The top drive 1440 can turn the drillstring 1425. As an example, the top drive 1440 can include one or more motors (e.g., electric and/or hydraulic) connected with appropriate gearing to a short section of pipe called a quill, that in turn may be screwed into a saver sub or the drillstring 1425 itself. The top drive 1440 can be suspended from the traveling block 1411, so the rotary mechanism is free to travel up and down the derrick 1414. As an example, a top drive 1440 may allow for drilling to be performed with more joint stands than a kelly/rotary table approach.

In the example of FIG. 14, the mud tank 1401 can hold mud, which can be one or more types of drilling fluids. As an example, a wellbore may be drilled to produce fluid, inject fluid or both (e.g., hydrocarbons, minerals, water, etc.).

In the example of FIG. 14, the drillstring 1425 (e.g., including one or more downhole tools) may be composed of a series of pipes threadably connected together to form a long tube with the drill bit 1426 at the lower end thereof. As the drillstring 1425 is advanced into a wellbore for drilling, at some point in time prior to or coincident with drilling, the mud may be pumped by the pump 1404 from the mud tank 1401 (e.g., or other source) via a the lines 1406, 1408 and 1409 to a port of the kelly 1418 or, for example, to a port of the top drive 1440. The mud can then flow via a passage (e.g., or passages) in the drillstring 1425 and out of ports located on the drill bit 1426 (see, e.g., a directional arrow). As the mud exits the drillstring 1425 via ports in the drill bit 1426, it can then circulate upwardly through an annular region between an outer surface(s) of the drillstring 1425 and surrounding wall(s) (e.g., open borehole, casing, etc.), as indicated by directional arrows. In such a manner, the mud lubricates the drill bit 1426 and carries heat energy (e.g., frictional or other energy) and formation cuttings to the surface where the mud (e.g., and cuttings) may be returned to the mud tank 1401, for example, for recirculation (e.g., with processing to remove cuttings, etc.).

The mud pumped by the pump 1404 into the drillstring 1425 may, after exiting the drillstring 1425, form a mudcake that lines the wellbore which, among other functions, may reduce friction between the drillstring 1425 and surrounding wall(s) (e.g., borehole, casing, etc.). A reduction in friction may facilitate advancing or retracting the drillstring 1425. During a drilling operation, the entire drill string 1425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 1426 of the drill string 1425 at a bottom of a wellbore, pumping of the mud commences to lubricate the drill bit 1426 for purposes of drilling to enlarge the wellbore. As mentioned, the mud can be pumped by the pump 1404 into a passage of the drillstring 1425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 1425) may be transmitted uphole to an uphole device, which may relay such information to other equipment for processing, control, etc.

As an example, telemetry equipment may operate via transmission of energy via the drillstring 1425 itself. For example, consider a signal generator that imparts coded energy signals to the drillstring 1425 and repeaters that may receive such energy and repeat it to further transmit the coded energy signals (e.g., information, etc.).

As an example, the drillstring 1425 may be fitted with telemetry equipment 1452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 14, an uphole control and/or data acquisition system 1462 may include circuitry to sense pressure pulses generated by telemetry equipment 1452 and, for example, communicate sensed pressure pulses or information derived therefrom for process, control, etc.

The assembly 1450 of the illustrated example includes a logging-while-drilling (LWD) module 1454, a measuring-while-drilling (MWD) module 1456, an optional module 1458, a roto-steerable system and motor 1460, and the drill bit 1426.

The LWD module 1454 may be housed in a suitable type of drill collar and can contain one or a plurality of selected types of logging tools. It will also be understood that more than one LWD and/or MWD module can be employed, for example, as represented at by the module 1456 of the drillstring assembly 1450. Where the position of an LWD module is mentioned, as an example, it may refer to a module at the position of the LWD module 1454, the module 1456, etc. An LWD module can include capabilities for measuring, processing, and storing information, as well as for communicating with the surface equipment. In the illustrated example, the LWD module 1454 may include a seismic measuring device.

The MWD module 456 may be housed in a suitable type of drill collar and can contain one or more devices for measuring characteristics of the drillstring 1425 and the drill bit 1426. As an example, the MWD tool 1454 may include equipment for generating electrical power, for example, to power various components of the drillstring 1425. As an example, the MWD tool 1454 may include the telemetry equipment 1452, for example, where the turbine impeller can generate power by flow of the mud; it being understood that other power and/or battery systems may be employed for purposes of powering various components. As an example, the MWD module 1456 may include one or more of the following types of measuring devices: a weight-on-bit measuring device, a torque measuring device, a vibration measuring device, a shock measuring device, a stick slip measuring device, a direction measuring device, and an inclination measuring device.

FIG. 14 also shows some examples of types of holes that may be drilled. For example, consider a slant hole 1472, an S-shaped hole 1474, a deep inclined hole 1476 and a horizontal hole 1478.

As an example, a drilling operation can include directional drilling where, for example, at least a portion of a well includes a curved axis. For example, consider a radius that defines curvature where an inclination with regard to the vertical may vary until reaching an angle between approximately 30 degrees and approximately 60 degrees or, for example, an angle to approximately 90 degrees or possibly greater than approximately 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 14, the wellsite system 1400 can include one or more sensors 1464 that are operatively coupled to the control and/or data acquisition system 1462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 1400. As an example, a sensor or sensor may be at an offset wellsite where the wellsite system 1400 and the offset wellsite are in a common field (e.g., oil and/or gas field).

As an example, one or more of the sensors 1464 can be provided for tracking pipe, tracking movement of at least a portion of a drillstring, etc.

As an example, the system 1400 can include one or more sensors 1466 that can sense and/or transmit signals to a fluid conduit such as a drilling fluid conduit (e.g., a drilling mud conduit). For example, in the system 1400, the one or more sensors 1466 can be operatively coupled to portions of the standpipe 1408 through which mud flows. As an example, a downhole tool can generate pulses that can travel through the mud and be sensed by one or more of the one or more sensors 1466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 1400 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

FIG. 15 shows an example of an environment 1501 that includes a subterranean portion 1503 where a rig 1510 is positioned at a surface location above a bore 1520. In the example of FIG. 15, various wirelines services equipment can be operated to perform one or more wirelines services including, for example, acquisition of data from one or more positions within the bore 1520.

In the example of FIG. 15, the bore 1520 includes drillpipe 1522, a casing shoe, a cable side entry sub (CSES) 1523, a wet-connector adaptor 1526 and an openhole section 1528. As an example, the bore 1520 can be a vertical bore or a deviated bore where one or more portions of the bore may be vertical and one or more portions of the bore may be deviated, including substantially horizontal.

In the example of FIG. 15, the CSES 1523 includes a cable clamp 1525, a packoff seal assembly 1527 and a check valve 1529. These components can provide for insertion of a logging cable 1530 that includes a portion 1532 that runs outside the drillpipe 1522 to be inserted into the drillpipe 1522 such that at least a portion 1534 of the logging cable runs inside the drillpipe 1522. In the example of FIG. 15, the logging cable 1530 runs past the wet-connect adaptor 1526 and into the openhole section 1528 to a logging string 1540.

As shown in the example of FIG. 15, a logging truck 1550 (e.g., a wirelines services vehicle) can deploy the wireline 1530 under control of a system 1560. As shown in the example of FIG. 15, the system 1560 can include one or more processors 1562, memory 1564 operatively coupled to at least one of the one or more processors 1562, instructions 1566 that can be, for example, stored in the memory 1564, and one or more interfaces 1568. As an example, the system 1560 can include one or more processor-readable media that include processor-executable instructions executable by at least one of the one or more processors 1562 to cause the system 1560 to control one or more aspects of equipment of the logging string 1540 and/or the logging truck 1550. In such an example, the memory 1564 can be or include the one or more processor-readable media where the processor-executable instructions can be or include instructions. As an example, a processor-readable medium can be a computer-readable storage medium that is not a signal and that is not a carrier wave.

FIG. 15 also shows a battery 1570 that may be operatively coupled to the system 1560, for example, to power the system 1560. As an example, the battery 1570 may be a back-up battery that operates when another power supply is unavailable for powering the system 1560 (e.g., via a generator of the wirelines truck 1550, a separate generator, a power line, etc.). As an example, the battery 1570 may be operatively coupled to a network, which may be a cloud network. As an example, the battery 1570 can include smart battery circuitry and may be operatively coupled to one or more pieces of equipment via a SMBus or other type of bus.

As an example, the system 1560 can be operatively coupled to a client layer 1580. In the example of FIG. 15, the client layer 1580 can include features that allow for access and interactions via one or more private networks 1582, one or more mobile platforms and/or mobile networks 1584 and via the "cloud" 1586, which may be considered to include distributed equipment that forms a network such as a network of networks. As an example, the system 1560 can include circuitry to establish a plurality of connections (e.g., sessions). As an example, connections may be via one or more types of networks. As an example, connections may be client-server types of connections where the system 1560 operates as a server in a client-server architecture. For example, clients may log-in to the system 1560 where multiple clients may be handled, optionally simultaneously.

FIGS. 14 and 15 show various examples of equipment in various examples of environments. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

As an example, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and/or inversion can be for measurements acquired at least in part via a downhole tool where such measurements may include different types of measurements, which may be referred to as multi-physics measurements. As an example, measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in an inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Interpretation of measurements can provide a variety of information about formation properties. As an example, a LWD formation tester can be used to determine formation pressure and fluid mobility which can be utilized to optimize a drilling process as well as, for example, to help build one or more static reservoir models (e.g., when combining other log measurements).

As an example, LWD propagation resistivity measurements can be used for bed boundary detection which can inform geosteering and/or well placement. As an example, LWD propagation resistivity measurements may be used for formation resistivity determination.

As an example, multiple spaced receivers may provide capabilities of radial resistivity profiling which can be an indicator of mud-filtrate invasion. As an example, information from a joint inversion may be utilized to model and determine mud-filtrate invasion, optionally under one or more scenarios (e.g., mud types, mud densities, mud flow rates, drilling rate, drilling equipment, etc.).

As an example, LWD nuclear measurements can be used for determination of density and porosity, while azimuthal nuclear density images may be applied for boundary detection and dip picking.

As an example, sigma (e.g., formation capture cross section) is a volumetric measurement that can provide resistivity independent saturation which is particularly useful for some difficult scenarios such as, for example, drilling, casing, producing, etc. in the presence of formation carbonates, a high-angle portion of a well, a low resistivity pay, etc. (e.g., particularly where other resistivity measurements may not provide for accurate water saturation). As an example, a method can include recording sigma at multiple depths of investigation while drilling to help verify presence or absence of shallow mud-filtrate invasion and thereby improve quality of water saturation estimation from sigma.

As an example, neutron-capture spectroscopy can be used to perform elemental analysis for quantitative lithology determination, which can be used to improve a formation evaluation process, for example, with a reduced number of input parameters.

As an example, LWD sonic measurements can be used to estimate radial spatial distribution of formation elastic properties, which may be a function of porosity, mineral composition, mud-filtrate invasion, and mechanical damage effects introduced by drilling. In such an example, sonic measurements can allow for feedback of an ongoing drilling process. For example, a method can include receiving LWD sonic measurements and other measurements and inverting for increasing accuracy of a model that can be utilized to determine one or more parameters and/or parameter values for further drilling, for one or more completions, for one or more production schemes, for one or more injection schemes, etc.

As an example, one or more interpretation methods for LWD measurements can be extended from one or more of those used for the interpretation of corresponding wireline measurements.

As an example, LWD measurements can be acquired in high angle and/or a horizontal portion of a well. As such, techniques for interpretation can differ from those applied in a vertical portion of a well, for example, due to geometric effects and complicated borehole environments.

As an example, a near-bore model may be utilized in a workflow where one or more dimensions of the near-bore model may be selected based at least in part on a type of measurement and/or a type of phenomenon that may occur that can affect a type of measurement (e.g., consider mud-filtrate invasion and its possible effect on one or more types of measurements). As an example, a near-bore model may extend radially to a distance of a measurement (e.g., a DOI). For example, for the aforementioned AIT, a distance may correspond to a specified measurement depth (e.g., AT10 to AT90, etc.).

Wireline resistivity logs are known to be affected by factors such as mud-filtrate invasion; whereas, LWD measurements tend to be less affected. However, invasion can still exist during LWD and it can be desirable to account for invasion in log interpretation. At the time of LWD, mudcake may not be completely formed such that invasion may be actively ongoing, which may cause a supercharging phenomenon that can affect measurement of formation pressure. And, as invasion can be relatively rapid at such a stage, multiple passes of LWD may see time-lapse changes on logs.

As an example, a framework or frameworks can provide for integrated interpretation of LWD measurements, or both LWD and WL measurements simultaneously, which can output, at least, formation parameters that characterize a formation.

As to various types of measurements, these can include, for example, borehole images, gamma ray, resistivity, density, neutron porosity, spectroscopy, sigma, elastic waves, and pressure. One or more techniques may be used to detect one or more boundaries and/or extract dip and azimuth information from one or more images and/or one or more logs.

As mentioned, LWD measurements can be acquired in a high angle (Ha) portion or portions of a bore and/or a horizontal (Hz) portion or portions of a bore. The term horizontal may be defined according to accepted practice (see, e.g., FIG. 14 and various bore types and definitions).

As an example, the computational framework 1300 of FIG. 13 may include and/or may be operatively coupled to a commercially available framework such as, for example, the TECHLOG® framework (Schlumberger Limited, Houston, Tex.). The TECHLOG® framework includes features for wellbore-centric, cross-domain workflows to different disciplines: petrophysics, geology, geophysics, drilling, and reservoir and production engineering. The TECHLOG® framework provides an integrated data reception and processing environment to process bore data and deliver results. The TECHLOG® framework includes a user interface for project management, a graphical zonation interface and zone manager, as well as a trend line object that can be applied across multiple wells. The TECHLOG® framework includes a production logging that includes a log simulator powered by OLGA and an enhanced array tool workflow supporting tools from various oilfield service companies. The TECHLOG® framework includes a pore pressure prediction feature that includes an interface and associated functionalities. The TECHLOG® framework includes a wellbore stability feature that can provide for sanding analysis and anisotropic geomechanics workflows.

The TECHLOG® framework includes: core systems features such as BASE, C-Data-API, CoreDB, Real Time, TechData-Plus, TechStat, and Viewer; geology features such as Advanced Plotting, Field Map, Ipsom, K.mod, and Wellbore Imaging (Wbi); geomechanics features such as Completion Geomechanics, Pore Pressure Prediction, and Wellbore Stability; geophysics features such as Acoustics and Geophy; petrophysics features such as 3D Petrophysics, Acoustics, Nuclear Magnetic Resonance (NMR), Quanti., Quanti.Elan, TechCore and Thin Bed Analysis (TBA); production features such as Cased Hole, Production Logging, and Wellbore Integrity; reservoir engineering features such as Fluid Contact, Formation Pressure, Saturation-Height Modeling (SHM), and TechCore; and shale features such as Unconventionals and Quanti.Elan.

As an example, the computational framework 1300 of FIG. 13 may include and/or be operatively coupled with another framework such as, for example, the PETREL® framework and/or the OCEAN® framework.

As an example, a framework or frameworks can provide for performing rate transient analysis, studying reservoir connectivity and fault transmissibility, determining sensitivity to particular uncertain parameters, and/or designing wells and completion configurations.

As an example, the PETREL® framework may be operatively coupled to one or more of the INTERSECT® reservoir simulator and the ECLIPSE® reservoir simulator, enabling truly integrated reservoir simulation studies and field development projects.

As an example, the TECHLOG® framework may be operatively coupled to the PETREL® framework, which may be operatively coupled to the ECLIPSE® framework (e.g., fluid flow simulator thereof) and/or the INTERSECT® framework (e.g., fluid flow simulator thereof).

As an example of a formation, consider the Bakken formation, which is a rock unit from the Late Devonian to Early Mississippian age occupying about 200,000 square miles (520,000 km$^2$) of the subsurface of the Williston Basin. As an example, a well can be drilled and completed in the middle member of the Bakken formation and/or, for example, the basal Sanish/Pronghorn member, in the underlying Three Forks Formation, etc.

Porosities in the Bakken formation can average about 5 percent and permeabilities can tend to be low, averaging approximately 0.04 millidarcies. The presence of vertical to sub-vertical natural fractures makes the Bakken a candidate for horizontal drilling techniques where, for example, at least a portion of a well may be drilled horizontally (e.g., along bedding planes). In such an approach, a bore can contact hundreds of meters of reservoir rock in a unit that may have a maximum thickness of approximately 40 meters (e.g., approximately 140 feet). As an example, production may be enhanced by artificially fracturing rock (e.g., via hydraulic fracturing).

As an example, a method can include receiving information for a subsurface region; based at least in part on the information, identifying sub-regions within the subsurface region; assigning individual identified sub-regions a dimensionality of a plurality of different dimensionalities that correspond to a plurality of different models; via a model-based computational framework, generating at least one result for at least one of the individual identified sub-regions based at least in part on at least one assigned dimensionality; and consolidating the at least one result for multiple sub-regions. In such an example, generating can include generating a result for one of the individual identified sub-regions based at least in part on the assigned dimensionality of the one of the individual identified sub-regions and generating a result for another one of the individual identified sub-regions based at least in part on the assigned dimensionality of the another one of the individual identified sub-regions, where the assigned dimensionalities differ. In such an example, the consolidating can include consolidating the result for the one of the individual identified sub-regions and the result of the another one of the individual identified sub-regions. In such an example, the consolidating can include outputting a smoothed, consolidated result in an overlap region of the two individual identified sub-regions. In such an example, smoothing may be via one or more statistical technique, one or more fitting technique, etc.

As an example, assigned dimensionalities can differ as to one or more of spatial dimensionality and dip. As to spatial dimensionality, consider 1D, 2D and 3D as examples. As an example, a 2D dimensionality may include radial dimensionality (e.g., radial rings about an axis of a trajectory, etc.).

As an example, where a method includes receiving information, at least a portion of information received can be acquired by a downhole tool string in a subsurface region. In such an example, the method can include controlling the downhole tool string based at least in part on at least one result for at least one of an individual identified sub-region based at least in part on at least one assigned dimensionality.

As an example, a downhole tool string can be a bottom hole assembly or part of a bottom hole assembly. As an example, a downhole tool string can be a wireline tool string or part of a wirelines tool string.

As an example, an individual sub-region can include layers. In such an example, the layers may differ in lithology.

As an example, as to sub-regions divided from a subsurface region, at least two adjacent sub-regions can differ in geometry. For example, consider a 1D sub-region adjacent to a 2D sub-region. As an example, at least two adjacent sub-regions can differ in angle of a borehole trajectory. For example, consider a sub-region where a borehole trajectory intersects a substantially planar surface of a layer orthogonally (e.g., approximately 90 degrees) and a sub-region where a borehole trajectory intersects a substantially planar surface at an angle of approximately 45 degrees. As an example, at least two adjacent sub-regions can differ in fluid invasion. For example, a sub-region can be composed of a relatively impermeable material such as shale, which can have a relatively high porosity but with pores that tend to be relatively small and disconnected, which makes it relatively impermeable. As an example, rock that is relatively impermeable rocks may act as sealing rock or cap rock for reservoirs as hydrocarbons cannot pass through them readily.

As an example, a plurality of different dimensionalities can include single dimensionality and dual dimensionality. In such an example, single dimensionality corresponds to a one-dimensional model and dual dimensionality corresponds to a two-dimensional model.

As an example, a plurality of different models can include one-dimensional models with dip, one-dimensional models without dip, two-dimensional models with dip and two-dimensional models without dip.

As an example, a system can include a processor; memory operatively coupled to the processor; and processor-executable instructions stored in the memory to instruct the system to: receive information for a subsurface region; based at least in part on the information, identify sub-regions within the subsurface region; assign individual identified sub-regions a dimensionality of a plurality of different dimensionalities that correspond to a plurality of different models; generate at least one result for at least one of the individual identified sub-regions based at least in part on at least one assigned dimensionality; and consolidate the at least one result for multiple sub-regions. In such an example, to generate can include generation of a result for one of the individual identified sub-regions based at least in part on the assigned dimensionality of the one of the individual identified sub-regions and generation of a result for another one of the individual identified sub-regions based at least in part on the assigned dimensionality of the another one of the individual identified sub-regions, where the assigned dimensionalities differ.

As an example, one or more computer-readable storage media can include computer-executable instructions executable to instruct a computing system to: receive information for a subsurface region; based at least in part on the information, identify sub-regions within the subsurface region; assign individual identified sub-regions a dimensionality of a plurality of different dimensionalities that correspond to a plurality of different models; generate at least one result for at least one of the individual identified sub-regions based at least in part on at least one assigned dimensionality; and consolidate the at least one result for multiple sub-regions. In such an example, to generate can include generation of a result for one of the individual identified sub-regions based at least in part on the assigned dimensionality of the one of the individual identified sub-regions and generation of a result for another one of the individual identified sub-regions based at least in part on the assigned dimensionality of the another one of the individual identified sub-regions, where the assigned dimensionalities differ.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more sets of instructions, for example, such as the one or more sets of instructions 270 of the system 250 of FIG. 2.

Figure 16:
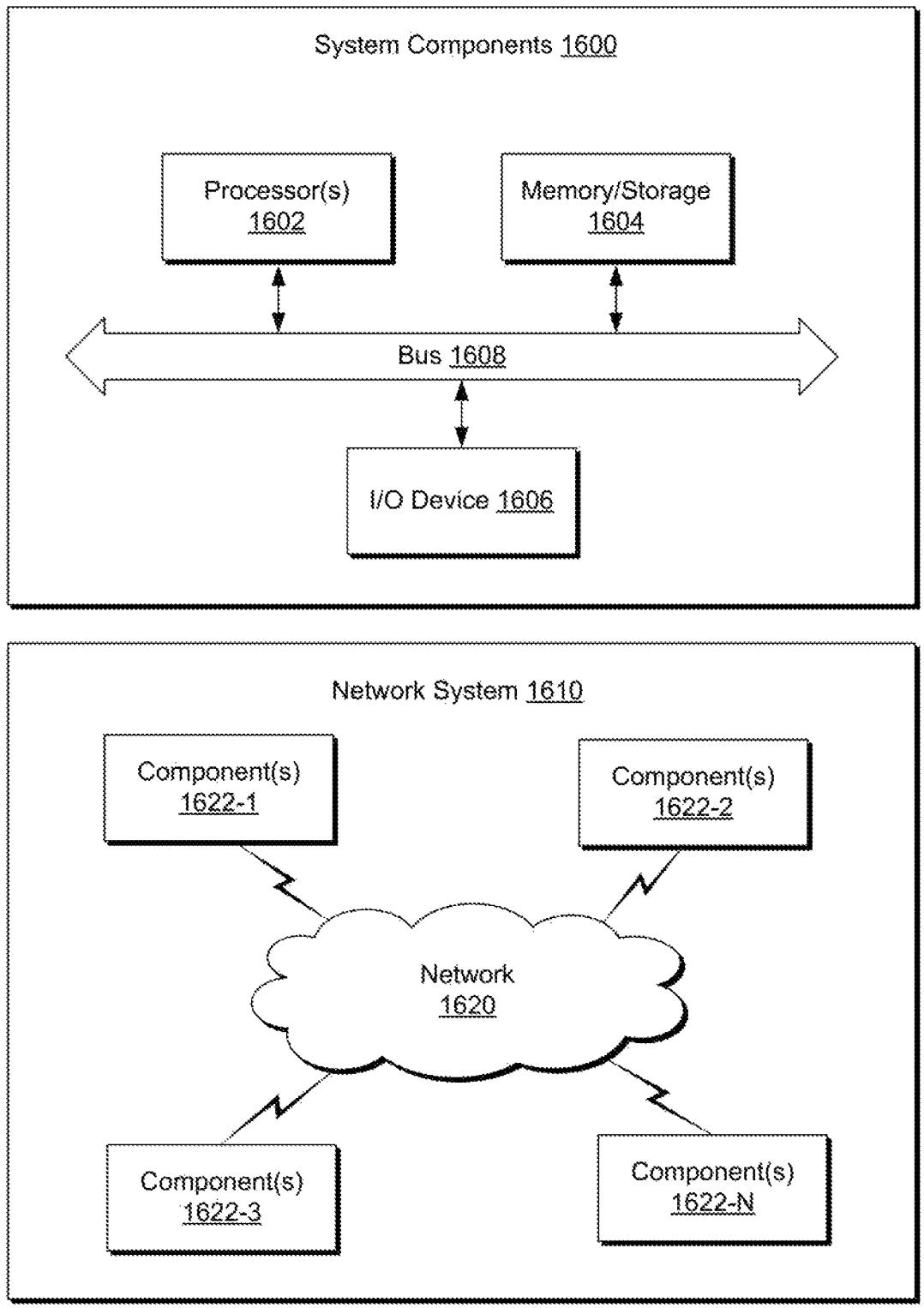
FIG. 16 illustrates example components of a system and a networked system.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving information for a subsurface region, wherein the information comprises log data acquired by a downhole tool string in a borehole defined by a borehole trajectory, wherein at least a portion of the borehole trajectory deviates from vertical;
   based at least in part on the information, identifying sub-regions along the borehole trajectory within the subsurface region;
   assigning individual identified sub-regions a dimensionality of a plurality of different dimensionalities that correspond to a plurality of different models, wherein the plurality of different models comprise at least a one-dimensional model with dip or a one-dimensional model without dip and a two-dimensional cylindrical model with dip or a two-dimensional cylindrical model without dip;
   via a model-based computational framework, generating at least one result for at least one of the individual identified sub-regions along the borehole trajectory based at least in part on at least one assigned dimensionality; and
   consolidating the at least one result for multiple sub-regions along the borehole trajectory.

2. The method of claim 1 wherein the generating comprises generating a result for one of the individual identified sub-regions based at least in part on the assigned dimensionality of the one of the individual identified sub-regions and generating a result for another one of the individual identified sub-regions based at least in part on the assigned dimensionality of the another one of the individual identified sub-regions, wherein the assigned dimensionalities differ.

3. The method of claim 2 wherein the consolidating comprises consolidating the result for the one of the individual identified sub-regions and the result of the another one of the individual identified sub-regions.

4. The method of claim 3 wherein the consolidating comprises outputting a smoothed, consolidated result in an overlap region of the two individual identified sub-regions.

5. The method of claim 2 wherein the assigned dimensionalities differ as to one or more of spatial dimensionality and dip.

6. The method of claim 1 comprising controlling the downhole tool string based at least in part on the at least one result.

7. The method of claim 1 wherein the downhole tool string comprises a bottom hole assembly.

8. The method of claim 1 wherein the downhole tool string comprises a wireline tool string.

9. The method of claim 1 wherein an individual sub-region comprises layers.

10. The method of claim 8 wherein the layers differ in lithology.

11. The method of claim 1 wherein at least two adjacent sub-regions differ in geometry.

12. The method of claim 1 wherein at least two adjacent sub-regions differ in angle of the borehole trajectory.

13. The method of claim 1 wherein at least two adjacent sub-regions differ in fluid invasion.

14. The method of claim 1, comprising determining an indication of fluid invasion in a portion of the subsurface region, wherein the assigning comprises, responsive to the determining, assigning at least one of the identified sub-regions the two-dimensional cylindrical model with dip or the two-dimensional cylindrical model without dip.

15. The method of claim 14, comprising modeling fluid invasion using at least the assigned two-dimensional cylindrical model with dip or the assigned two-dimensional cylindrical model without dip.

16. The method of claim 14, comprising modeling borehole mechanics for a risk of collapse using at least the assigned two-dimensional cylindrical model with dip or the assigned two-dimensional cylindrical model without dip.

17. The method of claim 14, comprising modeling fluid invasion and modeling borehole mechanics for a risk of collapse using at least the assigned two-dimensional cylindrical model with dip or the assigned two-dimensional cylindrical model without dip.

18. The method of claim 14, wherein the determining comprises analyzing at least a portion of the log data, with respect to radial depth, for an indication of fluid invasion.

19. A system comprising:
   a processor;
   memory operatively coupled to the processor; and
   processor-executable instructions stored in the memory to instruct the system to:
      receive information for a subsurface region, wherein the information comprises log data acquired by a downhole tool string in a borehole defined by a borehole trajectory, wherein at least a portion of the borehole trajectory deviates from vertical;
      based at least in part on the information, identify sub-regions along the borehole trajectory within the subsurface region;
      assign individual identified sub-regions a dimensionality of a plurality of different dimensionalities that correspond to a plurality of different models, wherein the plurality of different models comprise at least a one-dimensional model with dip or a one-dimensional model without dip and a two-dimensional cylindrical model with dip or a two-dimensional cylindrical model without dip;

generate at least one result for at least one of the individual identified sub-regions along the borehole trajectory based at least in part on at least one assigned dimensionality; and consolidate the at least one result for multiple sub-regions along the borehole trajectory.

20. One or more computer-readable storage media comprising computer-executable instructions executable to instruct a computing system to:

receive information for a subsurface region, wherein the information comprises log data acquired by a downhole tool string in a borehole defined by a borehole trajectory, wherein at least a portion of the borehole trajectory deviates from vertical;

based at least in part on the information, identify sub-regions along the borehole trajectory within the subsurface region;

assign individual identified sub-regions a dimensionality of a plurality of different dimensionalities that correspond to a plurality of different models, wherein the plurality of different models comprise at least a one-dimensional model with dip or a one-dimensional model without dip and a two-dimensional cylindrical model with dip or a two-dimensional cylindrical model without dip;

generate at least one result for at least one of the individual identified sub-regions along the borehole trajectory based at least in part on at least one assigned dimensionality; and consolidate the at least one result for multiple sub-regions along the borehole trajectory.

* * * * *